(12) United States Patent
Yamamoto et al.

(10) Patent No.: US 7,536,125 B2
(45) Date of Patent: May 19, 2009

(54) IMAGE FORMING APPARATUS CAPABLE OF SUPPRESSING DEVELOPER WASTE

(75) Inventors: Masanobu Yamamoto, Nara (JP); Hidenobu Mandai, Nara (JP); Masahiko Fujita, Nara (JP); Takayuki Ohno, Nara (JP); Masaki Saka, Mie (JP); Kouzou Yamaguchi, Nara (JP); Osamu Fujimoto, Nara (JP); Masaya Asakawa, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 437 days.

(21) Appl. No.: 10/555,862

(22) PCT Filed: Apr. 30, 2004

(86) PCT No.: PCT/JP2004/006366

§ 371 (c)(1),
(2), (4) Date: Nov. 7, 2005

(87) PCT Pub. No.: WO2004/099883

PCT Pub. Date: Nov. 18, 2004

(65) Prior Publication Data

US 2006/0216047 A1    Sep. 28, 2006

(30) Foreign Application Priority Data

May 8, 2003  (JP)  ............................. 2003-130453
May 13, 2003 (JP)  ............................. 2003-134609

(51) Int. Cl.
  *G03G 15/00* (2006.01)
(52) U.S. Cl. .................. 399/45; 399/196; 399/198; 399/200
(58) Field of Classification Search ............... 399/45, 399/196–198, 200, 289
  See application file for complete search history.

(56) References Cited

FOREIGN PATENT DOCUMENTS

| JP | 2-58763 | U | 4/1990 |
|----|---------|---|--------|
| JP | 6-301256 | A | 10/1994 |
| JP | 7-148970 | A | 6/1995 |
| JP | 10-186951 | A | 7/1998 |
| JP | 2001-347720 | A | 12/2001 |
| JP | 2002-189381 | A | 7/2002 |

*Primary Examiner*—David M Gray
*Assistant Examiner*—Laura K Roth
(74) *Attorney, Agent, or Firm*—Birch, Stewart, Kolasch & Birch, LLP

(57) ABSTRACT

A line sensor that detects the edge position of a recording paper is provided on the upstream side of a transfer point where an image formed on a first photosensitive drum is transferred to the recording paper. When performing borderless image formation, the size of the image on the first photosensitive drum to be transferred to the midstream of the recording paper after detection of its edge position is changed to a smaller size based on the detection results by the line sensor, and subsequent image formation to the recording paper continues to be performed according to this image on the photosensitive drum whose size has been changed.

20 Claims, 25 Drawing Sheets

IMAGE FORMING APPARATUS CAPABLE OF SUPPRESSING DEVELOPER WASTE

TECHNICAL FIELD

The present invention relates to an electrophotographic image forming apparatus, and is specifically concerned with a measure for reducing as much as possible the amount of developer recovered after not being transferred to a sheet.

BACKGROUND ART

Generally, in this type of image forming apparatus, an electrostatic latent image is formed on an image carrier based on input image data, that electrostatic latent image is developed (made manifest) by a developing apparatus, and a development image is formed on the image carrier. The development image formed on this image carrier is transferred to a transported sheet, and afterwards the development image is fused by a fixing apparatus with heat and pressure and fixed to the sheet.

Incidentally, when a positional shift occurs between the development image formed on the image carrier and the transported sheet due to transport shift of the sheet or the like, the position of the read original image and the position of the formed image will differ. Often this transport shift of the sheet is not constant, and varies according to differences in the size and type of sheet, or the housing means in which sheets are contained. Accordingly, if a positional shift occurs between the development image and the sheet when performing borderless image formation, in which an image is formed on the entire sheet (full-sheet image formation), loss occurs in the image transferred to the sheet, and the image formed will be very unsightly.

Thus, considering positional shift between the development image formed on the image carrier and the sheet due to transport shift of the sheet, a large image (development image) is formed with a certain margin on the image carrier, and even if transport shift of the sheet occurs, a good image without loss can be formed.

However, with the configuration as stated above, when forming an image on the image carrier that greatly exceeds the size of the transported sheet, the amount of developer recovered by the cleaning means after not being transferred to the sheet increases, and with an image forming apparatus that cannot reuse the recovered developer, in addition to being very uneconomical because the recovered developer is discarded, the cycle until the recovered developer is full becomes very short. Also, as shown in FIG. 25, in a cleaning means "c" provided with an integrated container "a" that recovers developer "t" on a transfer belt "d" that attracts and transports a sheet "p", that recovered developer "t" is partially uneven and much of it accumulates in the area located in the left and right edge portions of the sheet "p" perpendicular to the sheet transport direction, so that it becomes easy for a portion of the recovered developer t to leak out, leading to poor cleaning.

Accordingly, conventional technology is known (for example, see JP 10-186951A) wherein upstream in the sheet transport direction relative to the transfer point where the image formed on the image carrier is transferred to the sheet, a detecting means is provided that detects the position of the edge portion of the sheet transported towards the transfer point, the size of the image on the image carrier is determined based on the size of the sheet whose edge position has been detected by this detecting means, and by forming an image on the sheet according to the image formed on the image carrier after that size determination, an image is formed on the image carrier whose size matches the size of the transported sheet, and the amount of developer recovered by the cleaning means after not being transferred to the sheet is reduced.

However, in the conventional technology described above, because an image is formed on the image carrier after detecting the edge portion position of the sheet with the detecting means and determining the size of the image on the image carrier, it is necessary to provide the detecting means far upstream in the sheet transport direction relative to the transfer point. Thus, the sheet transport path from the detection point of the sheet edge portion position detected by the detecting means to the transfer point must be quite long in the sheet transport direction, and the size of the image forming apparatus becomes quite large. Furthermore, when the sheet transport path from the detection point of the sheet edge portion position detected by the detecting means to the transfer point is lengthened, the time necessary for image formation is lengthened correspondingly.

Also, when the sheet transport path from the detection point of the sheet edge portion position detected by the detecting means to the transfer point is lengthened, although there is a risk that loss will occur in the image on the sheet due to transport shift of the sheet because the detection accuracy of the sheet edge position detected by the detecting means decreases, if the detecting means is moved closer to the transfer point, image writing to the image carrier will have already begun at the point in time that the sheet edge position is detected, and determination of the image size on the image carrier is not performed in time.

Incidentally, upstream in the sheet transport direction relative to the image carrier, a registration means is provided that is a timing matching means for matching the position of the image formed on that image carrier and the transported sheet. After once stopping the transported sheet, the timing is matched and then sheet transport is restarted. This registration means not only has a function that matches timing with the image on the image carrier, it also has a function that corrects skew (tilted transport) of the transported sheet.

However, there is a limit to the function of this registration means that corrects skew, and for skew that exceeds a tolerance, more or less tilted transport of the sheet sometimes occurs without skew being completely corrected. In that case, in order to judge the skew state of the sheet, because detection of the edge position must be performed at multiple places in the transport direction for the transported sheet, the position of the detecting means must be further separated upstream in the sheet transport direction in order to judge the skew state of the sheet at a timing earlier than the formation of the image on the image carrier. When this detecting means is located downstream of the registration means in the sheet transport direction, the image forming apparatus must be made even larger.

DISCLOSURE OF INVENTION

The present invention was made in consideration of the circumstances described above, and it is an object thereof to provide an image forming apparatus that, by shortening the sheet transport path from the detection point to the transfer point, achieves compactness while insuring detection accuracy of the sheet edge position, or the sheet edge position and skew state, by the detecting means, and along with reducing the amount of developer recovered by the cleaning means as much as possible and extending the cycle until the developer is full, can effectively prevent poor cleaning.

The image forming apparatus of the present invention forms an image on an image carrier based on input image data and transfers the image to a transported sheet, forming an image on this sheet. This image forming apparatus includes a detecting means for detecting the edge position of the sheet transported toward a transfer point where the image formed on the image carrier is transferred to the sheet, the detecting means being provided upstream in the sheet transport direction relative to the transport point. When the size of the image on the image carrier is larger than the size of the sheet transported toward the transfer point, the size of the image on the image carrier to be transferred to the midstream of the sheet after detection of the sheet edge position by the detecting means is changed, based on the detection results from the detecting means, and subsequent image formation to the sheet continues to be performed according to this image on the image carrier whose size has been changed.

With this image forming apparatus of the invention, an image on the image carrier larger than the size of the sheet transported toward the transfer point is transferred to the sheet before detection of the sheet edge position by the detecting means, and when the sheet edge position is detected by the detecting means, the size of the image on the image carrier to be transferred to the midstream of the sheet is changed based on those detection results. That is, before and after detection obtaining the sheet edge position is performed by the detecting means, the size of the image formed on the image carrier is changed. Thus, before detection by the detecting means, even if the sheet edge position is not detected, with the image on the image carrier that is larger than the size of the sheet it is possible to transfer a good image onto the sheet without causing image loss due to transport shift of the sheet. After detection by the detecting means, even if determination of the size of the image on the image carrier is not performed in time, the size of the image on the image carrier is changed to a size conforming to the sheet edge position based on the results of detecting the sheet edge position. Thus, the amount of developer recovered by the cleaning means after not being transferred to the sheet is decreased as much as possible, and in addition to being able to economically consume developer by suppressing developer waste, it is also possible to extend the cycle until recovered developer is full. In the cleaning means as well, in which a container that contains the recovered developer is integrated, partial accumulation of the recovered developer in the container is suppressed and it is possible to prevent poor cleaning due to a portion of the recovered developer leaking out.

By forming the image on the image carrier before detection of the sheet edge position by the detecting means, it is possible to provide the detecting means closer to the transfer point. Thus the transport path of the sheet from the detection point at which the sheet edge position is detected by the detecting means to the transfer point is shortened in the transport direction of the sheet, and in addition to being able to achieve a more compact image forming apparatus, it is possible to shorten the time necessary for image formation.

Also, in the image forming apparatus of the present invention, a configuration may be adopted wherein the image formed on the image carrier before detection of the sheet edge position by the detecting means is set to a large size provided with a margin in consideration of transport shift of the sheet transported toward the transfer point.

With this image forming apparatus of the present invention, even if the sheet edge position is not detected by the detecting means, image loss due to transport shift of the sheet is reliably prevented by an image on the image carrier having a large size with a margin, and a better image can be transferred onto the sheet.

Also, in the image forming apparatus of the present invention, a configuration may be adopted wherein the detecting means is provided further downstream than a registration means for correcting transport tilt of the sheet before detection of the sheet edge position by this detecting means, and adjusting the position of the image on the image carrier relative to the sheet.

With this image forming apparatus of the present invention, by locating the detecting means downstream of the registration means, tilted transport of the sheet transported toward the transfer point is corrected by the registration means. The sheet edge position is detected in an approximately straightly transported state, and in addition to detecting the sheet edge position with high precision, the image, which is allowed to have a margin on the image carrier and is formed before detection of the sheet edge position by the detecting means, becomes as small as possible. Thus the amount of wasted developer recovered after not being transferred to the sheet is reduced, and it is possible to lengthen the cycle until the developer recovery container of the cleaning means is full.

Also, in the image forming apparatus of the present invention, a configuration may be adopted wherein the distance from the detection point by the detecting means to the transfer point is set to be shorter than the distance from the writing point of the image onto the image carrier to the transfer point, the size of the image formed on the image carrier before detection of the sheet edge position by the detecting means is set based on data prescribed in advance, and the size of the image formed on the image carrier after detection of the sheet edge position by the detecting means is changed based on the detection results of the detecting means.

With this image forming apparatus of the present invention, because the distance from the detection point detected by the detecting means to the transfer point is set shorter than the distance from the writing point where the image is written on the image carrier to the transfer point, detection of the sheet edge position by the detecting means can be performed at an early stage. By quickly changing the size of the image on the image carrier based on the detection results after detecting the sheet edge position with the detecting means, the amount of wasted developer that is recovered after not being transferred to the sheet is decreased, and it is possible to further lengthen the cycle until the developer recovery container of the cleaning means is full.

Also, in the image forming apparatus of the present invention, a configuration may be adopted wherein a plurality of image carriers that individually form an image on the sheet are provided arranged in parallel in the transport direction of a sheet carrier that carries and transports the sheet, the size of the image on the image carrier located furthest upstream in the sheet transport direction among the image carriers is changed during image formation after detection of the sheet edge position by the detecting means, and the size of the image on the other image carriers is changed before image formation based on the results of detecting the sheet edge position with the detecting means.

With this image forming apparatus of the present invention, in a tandem image forming apparatus having a plurality of image carriers, because the position of the various image carriers is different, the timing for changing the size of the image on the image carriers and the timing for forming an image on the various image carriers varies based on the results of detecting the sheet edge position with the detecting means. At the image carrier located furthest upstream in the sheet transport direction, the size of the image is changed during image formation subsequent to detection of the sheet edge position, but at the other image carriers, an image is formed with a size (a size with as little margin as possible) based on the results of detecting the sheet edge position with the detecting means before image formation onto the respective image carriers. Thus, the amount of wasted developer that is recovered after not being transferred to the sheet can be effectively reduced, and the cycle until the developer recovery container of the cleaning means is full can be lengthened.

Also, in the image forming apparatus of the present invention, a configuration may be adopted wherein there is correction data for one among the various image carriers that corrects image forming positional shift of the remaining image carriers relative to that one image carrier, and the size of the image formed on the respective image carriers is set based on the results of detecting the sheet edge position with the detecting means and the correction data.

With this image forming apparatus of the present invention, in a tandem image forming apparatus, the range of the image formed on the respective image carriers is set according to the results of detecting the sheet edge position, detected by the detecting means provided adjacent to the image carrier located furthest upstream in the sheet transport direction, and correction data that, relative to a standard image carrier, corrects shift, tilt and the like of the other image carriers for which image forming positional shift, i.e. positional shift, writing means positional shift, transport tilt of the transfer belt, and the like are present. Thus, even if shift and tilt are present for the image carriers other than the standard image carrier, after detecting the sheet edge position with the detecting means, it is possible to form an image on the respective image carriers with a range that just barely fits on the sheet transported on the transfer carrier.

Also, in the image forming apparatus of the present invention, a configuration may be adopted wherein the magnification or position where the image is formed on the image carrier is set based on data prescribed in advance regardless of the results of detecting the sheet edge position with the detecting means.

With this image forming apparatus of the present invention, if the position or magnification is changed when changing the range in which image formation is performed on the image carrier during image formation on the sheet, the image is distorted or image continuity is lost, but if the position or magnification of the image is set based on data prescribed in advance, good image formation can be performed.

Also, in the image forming apparatus of the present invention, a configuration may be adopted wherein a borderless image forming mode for forming a borderless image on the sheet can be selected, and when this borderless image forming mode is selected, image formation is performed based on the results of detecting the sheet edge position with the detecting means.

With this image forming apparatus of the present invention, by just selecting the borderless image forming mode when forming a borderless image, the image forming range can be controlled based on the results of detecting the sheet edge position with the detecting means. Thus, while preventing image loss on the sheet, the amount of wasted developer recovered after not being transferred to the sheet is suppressed and the cycle until the developer recovery container of the cleaning means is full can be lengthened.

Also, in the image forming apparatus of the present invention, a configuration may be adopted wherein when the size of the image on the image carrier is larger than the size of the sheet transported toward the transfer point, the skew state of the sheet is also detected by detecting the sheet edge position with the detecting means, and the size of the image on the image carrier to be transferred to the midstream of the sheet after that detection is changed based on the results of detecting the edge position and skew state of the sheet with the detecting means, and subsequent image formation to the sheet continues to be performed according to this image on the image carrier whose size has been changed.

With to this image forming apparatus of the invention, an image on the image carrier larger than the size of the sheet transported toward the transfer point is transferred to the sheet before detection of the edge position and skew state of the sheet by the detecting means, and when the edge position and skew state of the sheet are detected by the detecting means, the size of the image on the image carrier to be transferred to the midstream of the sheet is changed based on those detection results. That is, before and after detection obtaining the edge position and skew state of the sheet is performed by the detecting means, the size of the image formed on the image carrier is changed. Thus, before detection of the edge position and skew state of the sheet by the detecting means, even if the results of detecting the edge position and skew state of the sheet are not obtained, with the image on the image carrier that is larger than the size of the sheet it is possible to transfer a good image onto the sheet without causing image loss due to skew of the sheet. On the other hand, after detection of the edge position and skew state of the sheet by the detecting means, even if determination of the size of the image on the image carrier is not performed in time, the size of the image on the image carrier is changed to a size conforming to the sheet edge position based on the results of detecting the edge position and skew state of the sheet. Thus, the amount of developer recovered by the cleaning means after not being transferred to the sheet is decreased as much as possible, and in addition to being able to economically consume developer by suppressing developer waste, it is also possible to extend the cycle until recovered developer is full. In the cleaning means as well, in which a container that contains the recovered developer is integrated, partial accumulation of the recovered developer in the container is suppressed and it is possible to prevent poor cleaning due to a portion of the recovered developer leaking out.

By forming the image on the image carrier before detection of the edge position and skew state of the sheet by the detecting means, it is possible to provide the detecting means closer to the transfer point. Thus the transport path of the sheet from the detection point at which the sheet edge position is detected by the detecting means to the transfer point is shortened in the sheet transport direction, and in addition to being able to achieve a more compact image forming apparatus, it is also possible to shorten the time necessary for image formation.

Also, in the image forming apparatus of the present invention, a configuration may be adopted wherein the image formed on the image carrier before detection of the edge position and skew state of the sheet by the detecting means is set to a large size provided with a margin in consideration of transport shift of the sheet transported toward the transfer point.

With this image forming apparatus of the present invention, even if the edge position and skew state of the sheet are not detected by the detecting means, image loss due to transport shift of the sheet is reliably prevented by an image on the image carrier having a large size with a margin, and a better image can be transferred onto the sheet.

Also, in the image forming apparatus of the present invention, a configuration may be adopted wherein the detecting means is provided further downstream in the sheet transport direction than a registration means that adjusts the position of the image on the image carrier relative to the sheet before detection of the edge position and skew state of the sheet by the detecting means.

With this image forming apparatus of the present invention, by locating the detecting means downstream of the registration means in the sheet transport direction, skew of the sheet transported toward the transfer point is corrected by the registration means. The edge position and skew state of the sheet are detected in a state with skew approximately corrected, and the edge position and skew state of the sheet are detected with high precision. In addition, the image, which is allowed to have a margin on the image carrier and is formed before detection of the edge position and skew state of the sheet by the detecting means, becomes as small as possible. Thus, the amount of wasted developer recovered after not being transferred to the sheet is reduced, and it is possible to further lengthen the cycle until the developer recovery container of the cleaning means is full.

Also, in the image forming apparatus of the present invention, a configuration may be adopted wherein the distance from the detection point by the detecting means to the transfer point is set to be shorter than the distance from the writing point of the image onto the image carrier to the transfer point, the size of the image formed on the image carrier before detection of the edge position and skew state by the detecting means is set based on data prescribed in advance, and the size of the image formed on the image carrier after detection of the edge position and skew state of the sheet by the detecting means is changed based on the results of detecting the edge position and skew state of the sheet with the detecting means.

With this image forming apparatus of the present invention, the distance from the detection point detected by the detecting means to the transfer point is set shorter than the distance from the writing point where the image is written on the image carrier to the transfer point. Detection of the edge position and skew state of the sheet by the detecting means can be performed at an early stage, and afterwards, the size of the image on the image carrier is quickly changed based on the results of detecting the edge position and skew state of the sheet with the detecting means. Thus the amount of wasted developer that is recovered after not being transferred to the sheet is decreased, and it is possible to further lengthen the cycle until the developer recovery container of the cleaning means is full.

Also, in the image forming apparatus of the present invention, a configuration may be adopted wherein the distance from the detection point detected by the detecting means to the transfer point is set to be shorter than the distance from the writing point of the image onto the image carrier to the transfer point, the size of the image formed on the image carrier is set based on the results of detecting the sheet edge position with the detecting means, and when the skew state of the sheet has been detected by the detecting means, the size of the image formed on the image carrier after that detection is changed based on the results of detecting the skew state of the sheet.

With this image forming apparatus of the present invention, because it is necessary when detecting the skew state of the sheet to transport the sheet to some extent and detect the edge position with the detecting means, it takes time to detect the skew state of the sheet, and the skew state of the sheet is detected after the timing for beginning image formation. When the skew state of the sheet has been detected, the size of the image on the image carrier thereafter is quickly changed according to the skew state of the sheet, and it is possible to decrease the amount of wasted developer recovered after not being transferred to the sheet.

Also, in the image forming apparatus of the present invention, a configuration may be adopted wherein the image forming apparatus also includes a plurality of image carriers that individually form an image on the sheet, arranged in parallel in the transport direction of a sheet carrier that carries and transports the sheet, and the size of the image on the image carrier located furthest upstream in the sheet transport direction among the image carriers is changed after image formation has begun based on the results of detecting the edge position and skew state of the sheet with the detecting means, and the size of the image on the other image carriers is changed before image formation begins based on the results of detecting the edge position and skew state of the sheet with the detecting means.

With this image forming apparatus of the present invention, in a tandem image forming apparatus having a plurality of image carriers, because the position of the various image carriers is different, the timing for changing the size of the image on the image carriers and the timing for forming an image on the various image carriers varies based on the results of detecting the edge position and skew state of the sheet with the detecting means. Thus, at the image carrier located furthest upstream in the sheet transport direction, the size of the image is changed after beginning image formation (during image formation) for which the results of detecting the edge position and skew state of the sheet with the detecting means have been obtained, but at the other image carriers, an image is formed with a size (a size with as little margin as possible) based on the results of detecting the edge position and skew state of the sheet with the detecting means before beginning image formation onto each image carrier. Thus, the amount of wasted developer that is recovered after not being transferred to the sheet can be effectively reduced, and the cycle until the developer recovery container of the cleaning means is full can be lengthened.

Also, in the image forming apparatus of the present invention, a configuration may be adopted wherein there is correction data for one among the various image carriers that corrects image forming positional shift of the remaining image carriers relative to that one image carrier, and the size of the image formed on the respective image carriers is set based on the results of detecting the edge position and skew state of the sheet with the detecting means and the correction data.

With this image forming apparatus of the present invention, in a tandem image forming apparatus, the size (range) of the image formed on the respective image carriers is set according to the results of detecting the edge position and skew state of the sheet, detected by the detecting means provided adjacent to the image carrier located furthest upstream in the sheet transport direction, and correction data that, relative to a standard image carrier, corrects shift, tilt and the like of the other image carriers for which image forming positional shift, i.e. positional shift, writing means positional shift, transport tilt of the transfer belt, and the like are present. Thus, even if shift and tilt are present for the image carriers other than the standard image carrier, after the results of detecting the edge position and skew state of the sheet with the detecting means are obtained, it is possible to form an image on the various image carriers with a range as small as possible relative to the sheet transported on the transfer carrier.

Also, in the image forming apparatus of the present invention, a configuration may be adopted wherein the magnification or position where the image is formed on the image carrier is set based on data prescribed in advance regardless of the results of detecting the edge position and skew state of the sheet with the detecting means.

With this image forming apparatus of the present invention, if the position magnification is changed when changing the range in which image formation is performed on the image carrier during image formation on the sheet, the image is distorted or image continuity is lost, but if the position or magnification of the image is set based on data prescribed in advance, a good image can be formed.

Also, in the image forming apparatus of the present invention, a configuration may be adopted wherein a borderless image forming mode for forming a borderless image on the sheet can be selected, and when this borderless image forming mode is selected, image formation is performed based on the results of detecting the edge position and skew state of the sheet with the detecting means.

With this image forming apparatus of the present invention, by just selecting the borderless image forming mode when forming a borderless image, the image forming range can be controlled based on the results of detecting the edge position and skew state of the sheet with the detecting means. Thus, while preventing image loss on the sheet, the amount of wasted developer recovered after not being transferred to the sheet is suppressed and the cycle until the developer recovery container of the cleaning means is full can be lengthened.

BEST MODE FOR CARRYING OUT THE INVENTION

Hereinafter, the present invention will be described by way of illustrative embodiments with reference to the drawings.

First Embodiment

Figure 1:
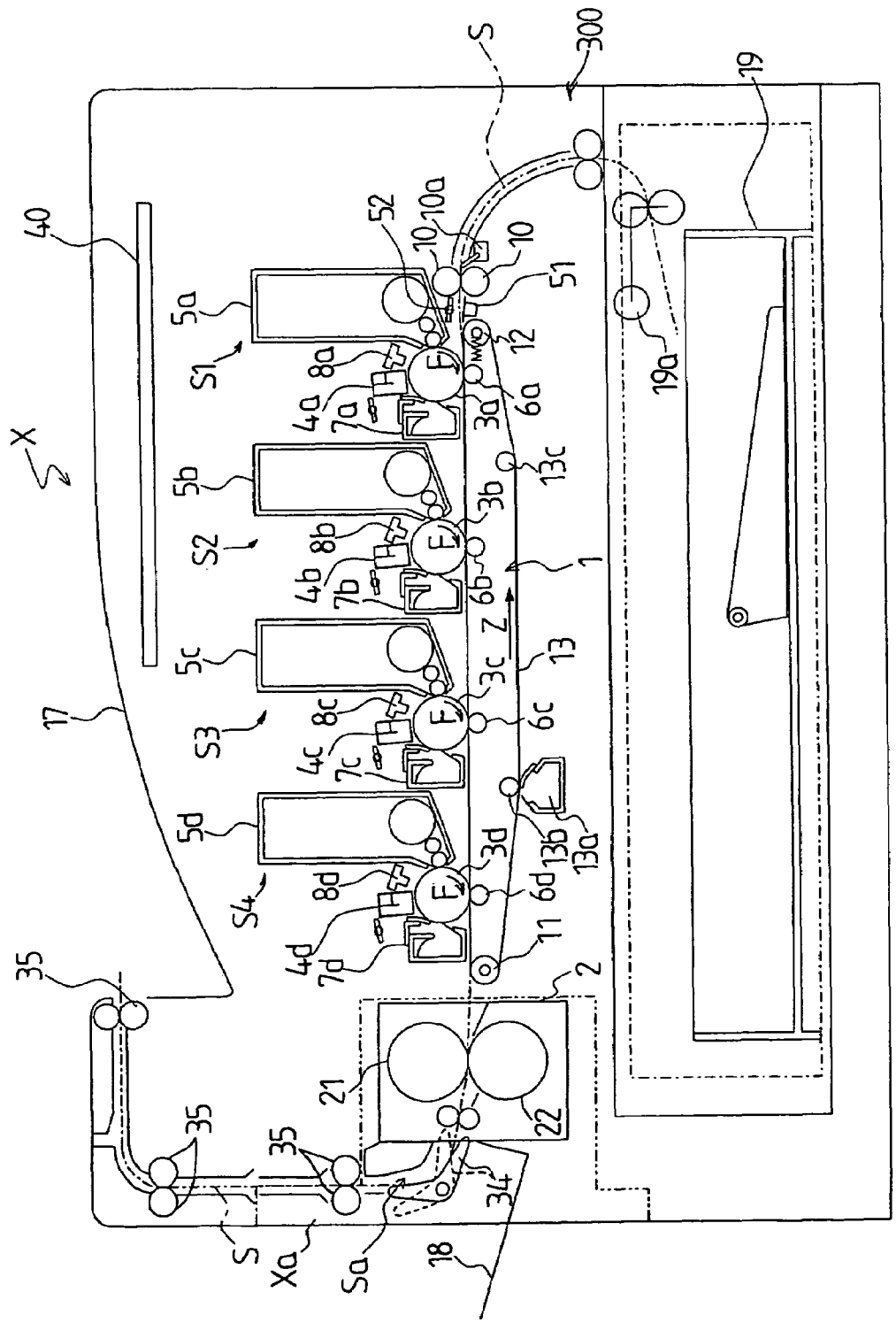
FIG. 1 is a schematic diagram that shows the overall configuration of the image forming apparatus employing an electrophotographic system associated with a first embodiment of the present invention.

FIG. 1 shows the relevant portions of an electrophotographic image forming apparatus associated with a first embodiment of the present invention. A transfer/transport belt mechanism 1 is provided in this image forming apparatus X. This transfer/transport belt mechanism 1 includes a drive roller 11 on one side (the left side of FIG. 1) supported such that it can rotate, an idler roller 12 in the other side (the right side of FIG. 1) supported such that it can rotate, and an endless transfer/transport belt 13 as a sheet carrier that is driven in the direction of arrow Z shown in FIG. 1, extended between the rollers 11 and 12. By electrostatically attracting a recording paper P as the sheet on the surface of this transfer/transport belt 13, the recording paper P, supplied from registration rollers 10 as a registration means, is transported from the other side (the upstream side) to the one side (the downstream side). The registration rollers 10 temporarily hold the recording paper P, which is transported through a paper transport path S, and have a purpose of transporting the recording paper P with proper timing, matching the rotation of photosensitive drums 3*a* through 3*d* such that proper multiple transfer of the toner images on the photosensitive drums 3*a* through 3*d* to the recording paper P can be performed. That is, the registration rollers 10, based on the detection signal that is output by a registration sensor 10*a*, are set such that the recording paper P is transported with the leading edge of the toner images on the photosensitive drums 3*a* through 3*d* matched to the leading edge of the printing range on the recording paper P. In this case, the transfer/transport belt 13 is provided with an endless shape using a film with a thickness of about 100 μm to 150 μm.

A fixing apparatus 2 is provided on the downstream side of the recording paper P transport direction of the transfer/transport belt mechanism 1, and a toner image transferred and formed on the recording paper P is fixed on the recording paper P by this fixing apparatus 2. The fixing apparatus 2 includes a hot roller 21 and a pressure roller 22 provided one above the other. The front and back sides of the recording paper P transported on the transfer/transport belt mechanism 1 (the transfer/transport belt 13) are passed via a nip between the hot roller 21 and the pressure roller 22.

Also, a first image forming station S1, a second image forming station S2, a third image forming station S3, and a fourth image forming station S4 are provided above the transfer/transport belt mechanism 1, placed at predetermined intervals in order from the upstream side (the right side in FIG. 1) of the recording paper transport path in the vicinity of the transfer/transport belt 13. In this case, the recording paper P on the transfer/transport belt 13 is transported to the first image forming station S1, the second image forming station S2, the third image forming station S3, and the fourth image forming station S4, in that order.

The image forming stations S1 through S4 are configured essentially the same, and include first to fourth photosensitive drums 3*a* through 3*d* as image carriers that each rotate in the direction shown by arrow F in FIG. 1. Provided in order in the direction of rotation (the direction of arrow F) of the photosensitive drums 3*a* through 3*d*, in the periphery of these photosensitive drums 3*a* through 3*d*, are first to fourth chargers 4*a* through 4*d* that charge the photosensitive drums 3*a* through 3*d* and form electrostatic latent images on the outer peripheral surface of the photosensitive drums 3*a* through 3*d*, first to fourth developing apparatuses 5*a* through 5*d* that develop an electrostatic latent image formed on the outer peripheral surface of the photosensitive drums 3*a* through 3*d* into a visible image using toner, first to fourth transfer rollers 6*a* through 6*d* as transfer means that transfer the developed toner image (visible image) on the outer peripheral surface of the photosensitive drums 3*a* through 3*d* to the recording paper P, and cleaning apparatuses 7*a* through 7*d* that remove toner remaining on the outer peripheral surface of the photosensitive drums 3*a* through 3*d*. In this case, the cleaning apparatuses 7*a* through 7*d* are formed integrated with the container.

Also, first to fourth exposing means 8*a* through 8*d* are provided above the photosensitive drums 3*a* through 3*d*. These exposing means 8*a* through 8*d* are writing means, and write an image on the surface of the charged photosensitive drums 3*a* through 3*d*, by light from an LED or laser for example, based on image information. Thus an electrostatic latent image is formed on the photosensitive drums 3*a* through 3*d*.

A pixel signal corresponding to a black component image of a color original image is input to the first exposing means 8*a* of the first image forming station S1 located furthest upstream in the transport direction of the transfer/transport belt 13, next a pixel signal corresponding to a cyan component image of the color original image is input to the second exposing means 8*b* of the second image forming station S2, a pixel signal corresponding to a magenta component image of the color original image is input to the third exposing means 8*c* of the third image forming station S3, and a pixel signal corresponding to a yellow component image of the color original image is input to the fourth exposing means 8*d* of the fourth image forming station S4 located furthest downstream. Thus an electrostatic latent image corresponding to color-converted original image information is formed on the outer peripheral surface of the photosensitive drums 3*a* through 3*d*.

Black toner is contained in the first developing apparatus 5*a* of the first image forming station S1, cyan toner is contained in the second developing apparatus 5*b* of the second image forming station S2, magenta toner is contained in the third developing apparatus 5*c* of the third image forming station S3, and yellow toner is contained in the fourth developing apparatus 5*d* of the fourth image forming station S4. The electrostatic latent image formed on the outer peripheral surface of the photosensitive drums 3*a* through 3*d* is developed into a visible image by these toners of each color, and thus the original image information is reproduced as a toner image by the toner of each color.

A charger (not shown) for attracting the recording paper is provided between the first image forming station S1 and the transfer/transport belt 13. This charger for attracting the recording paper charges the surface of the transfer/transport belt 13, and by reliably attracting the recording paper P, which is supplied from a paper supply tray 19 provided in the bottom portion of the image forming apparatus X, onto the transfer/transport belt 13, the recording paper P is transported in the interval from the first image forming station S1 to the fourth image forming station S4 without being shifted.

The transfer of the toner image from the photosensitive drums 3*a* through 3*d* to the recording paper P is performed by the transfer rollers 6*a* through 6*d*, which are in contact with the back side of the transfer/transport belt 13. A high voltage transfer bias (high voltage polarity (+) that is the opposite of the toner charging polarity (−)) is applied to the transfer rollers 6*a* through 6*d*. Each base of the transfer rollers 6*a* through 6*d* is made of a metal (for example, stainless steel) shaft with a diameter of 8 to 10 mm, the surface of the base is covered by an electrically conductive elastic material (such as EPDM or urethane foam, for example). With this electrically conductive elastic material it is possible to apply a uniform high voltage to the recording paper P. In this first embodiment, transfer rollers 6*a* through 6*d* are used as the transfer electrodes, but instead of those transfer rollers, brushes or the like may also be used.

The toner affixed to the transfer/transport belt 13 by making contact with the photosensitive drums 3*a* through 3*d* is set such that it is removed/recovered by a transfer belt cleaning unit 13*a*, because that toner may cause the back side of the recording paper P to be dirtied. A cleaning blade (not shown)

that makes contact with the transfer/transport belt 13 is provided in the transfer belt cleaning unit 13*a*, and the transfer/transport belt 13 in the area contacting the cleaning blade (below the interval between the third image forming station S3 and the fourth image forming station S4) is supported on the back side by a transfer/transport belt idler roller 13*b*. A transfer/transport belt idler roller 13*c* is also provided below the first image forming station S1, and the transfer/transport belt 13 is supported from the back side by this transfer/transport belt idler roller 13*c*.

The paper supply tray 19 is a tray for stockpiling the recording paper P used for image formation, and is provided in the bottom of the image forming portion of the image forming apparatus X. Also, a discharge tray 17 is provided in the upper portion of the image forming apparatus X for placing recording paper P for which image formation is complete face-down, and a discharge tray 18 is provided at the side of the image forming apparatus X for placing recording paper P for which image formation is complete face-up.

Also, an S-shaped paper transport path S is provided in the image forming apparatus X that feeds the recording paper P in the paper supply tray 19 to the discharge tray 17 via the transfer/transport belt mechanism 1 or the fixing apparatus 2. Further, a transport mechanism portion 300 is disposed in the paper transport path S from the paper supply tray 19 to the discharge tray 17 and the discharge tray 18. The transport mechanism portion 300 includes a pickup roller 19*a*, registration rollers 10, a transport direction switching guide 34, and transport rollers 35 that transport the recording paper P.

The transport rollers 35 comprise small rollers that facilitate and assist transport of the recording paper P, and a plurality of these are provided along the paper transport path S.

The transport direction switching guide 34 is provided such that it can rotate in a side cover Xa of the image forming apparatus X, and by changing from the state shown by the solid line to the state shown by the broken line, separates paper in the midst of the paper transport path S and discharges the recording paper P to the discharge tray 18 in the side portion of the image forming apparatus X. When the transport direction switching guide 34 is changed to the state shown by the solid line, the recording paper P is discharged to the upper portion discharge tray 17 via a transport portion Sa (a part of the paper transport path S) formed between the fixing apparatus 2, the side cover Xa, and the transport direction switching guide 34.

Figure 2:
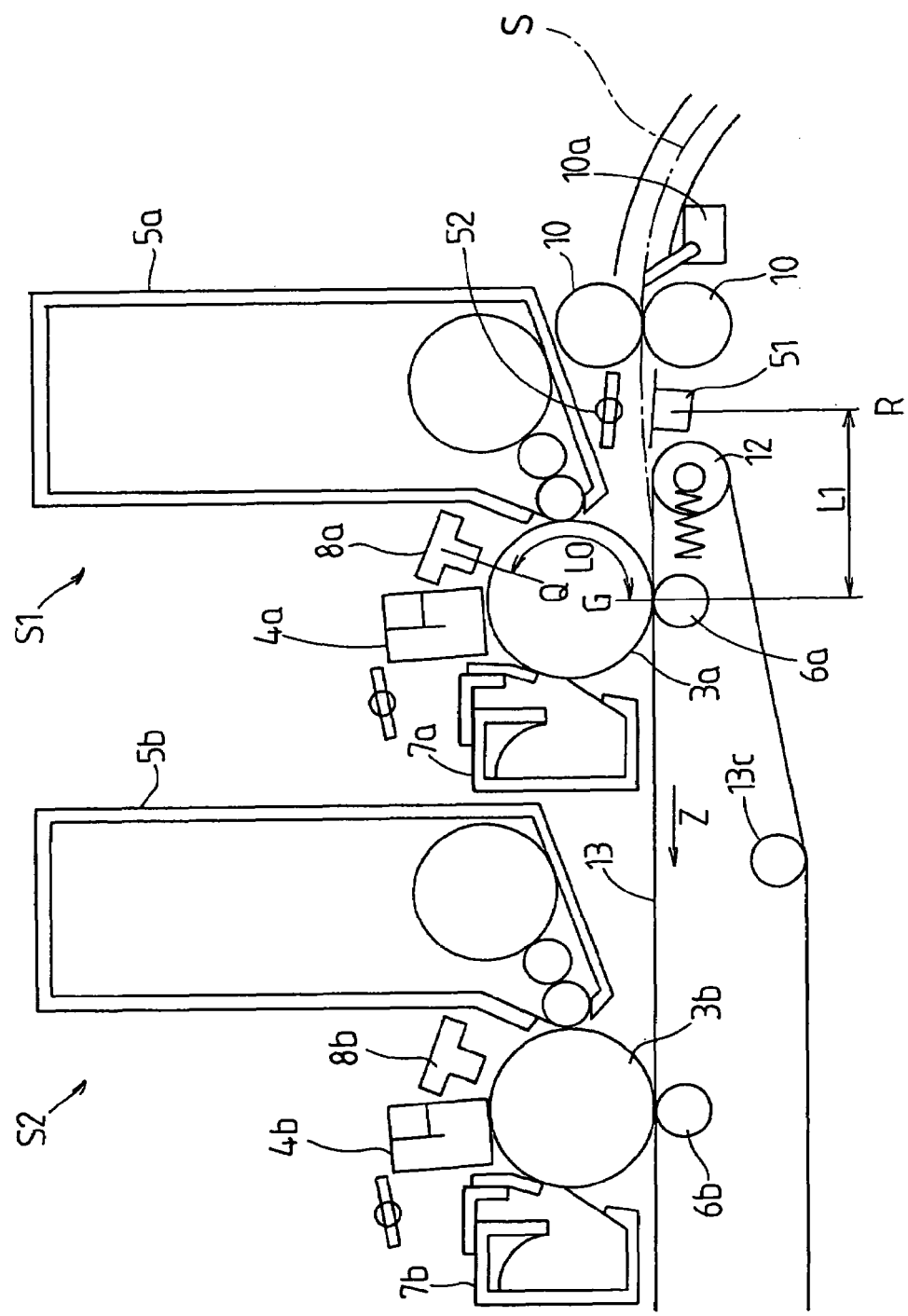
FIG. 2 is a schematic diagram that shows the configuration of the vicinity of identical first and second photosensitive drums.
Figure 3:
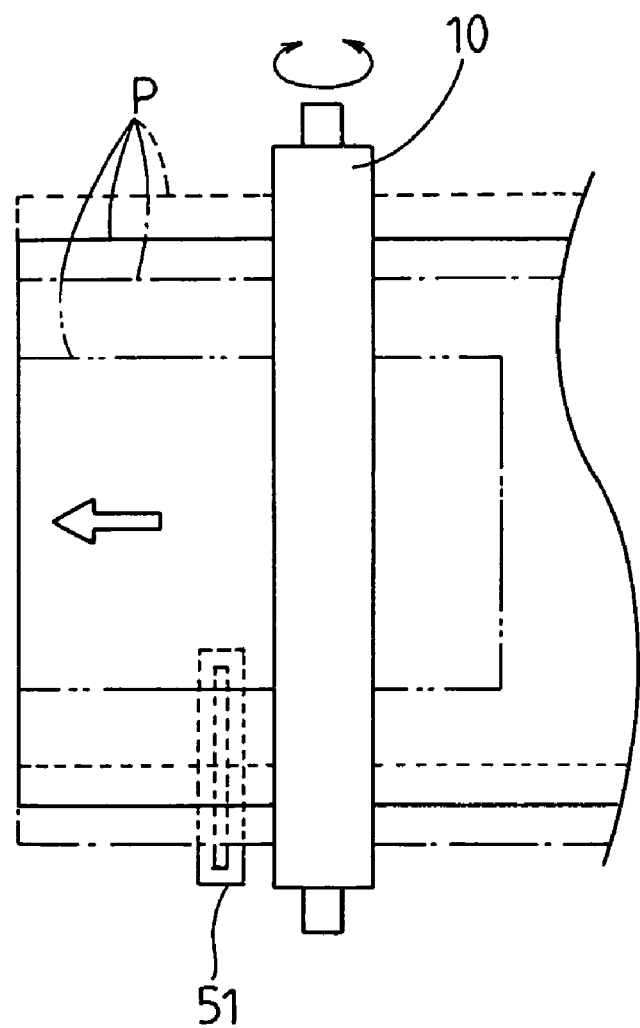
FIG. 3 is a plan view of the vicinity of identical line sensors, viewed from above.

As a characteristic portion of the present invention, as shown in FIG. 2, a line sensor 51 is provided on the upstream side of the recording paper transport direction relative to the transfer point G where the toner image (image) formed on the first photosensitive drum 3*a* of the first image forming station S1 is transferred to the recording paper P on the transfer/transport belt 13, as a detecting means that detects the edge position of the recording paper P transported towards the transfer point G. As shown in FIG. 3, this line sensor 51 is provided below one side (the bottom side in FIG. 3) in a direction perpendicular to the transport direction of the recording paper P. As shown in FIG. 2, the line sensor 51 is provided with an illuminating means 52 set facing upward apart from the paper transport path S, and the edge position of the recording paper P is detected according to whether or not the irradiated light from the illuminating means 52 is blocked by the recording paper P. Also, the line sensor 51 is arranged immediately downstream from the registration rollers 10 in the recording paper transport direction, transport tilt of the recording paper P is corrected by the registration rollers 10 prior to detection of the edge position of the recording paper P by the line sensor 51, and the position of the toner image (image) on the photosensitive drums 3*a* through 3*d* for that recording paper P is adjusted. In this case, because the irradiated light emitted from the illuminating means 52 is directly input to the line sensor 51, it is possible to set the emission intensity at a weak level, the line sensor 51 can be disposed near the recording paper P, and it is possible to detect the edge position of the recording paper P with good accuracy without using a lens means. A publicly sold line image sensor head for small scanners is used as the line sensor 51. Thus, its performance is approximately a resolution of 200 to 300 dpi, a pixel count of 864 to 1216, and a read-out range of 104 mm. As shown in FIG. 3, for example, even with the maximum size of the recording paper P being A3 (shown by the solid line in FIG. 3) and the minimum size being postcard-size (shown by the double-dashed line in FIG. 3), it is possible to cover recording paper P from the maximum size to the minimum size. FIG. 3 also shows the maximum value of corrected shift to one side (the lower side of FIG. 3) of the recording paper P when transport tilt is corrected by the registration rollers 10 (shown by the single-dashed line in FIG. 3), and the maximum value (shown by the broken line in FIG. 3) of corrected shift to the other side (the upper side of FIG. 3).

As shown in FIG. 2, a distance L1 from a detection point R of the edge position of the recording paper P detected by the line sensor 51 to the transfer point G is set to be shorter than a distance L0 from a writing point Q of the electrostatic latent image (image) formed by the first exposing means 8*a* on the photosensitive drum 3*a* of the first image forming station S1 to the transfer point G.

<Configuration of the Image Forming System>

Figure 4:
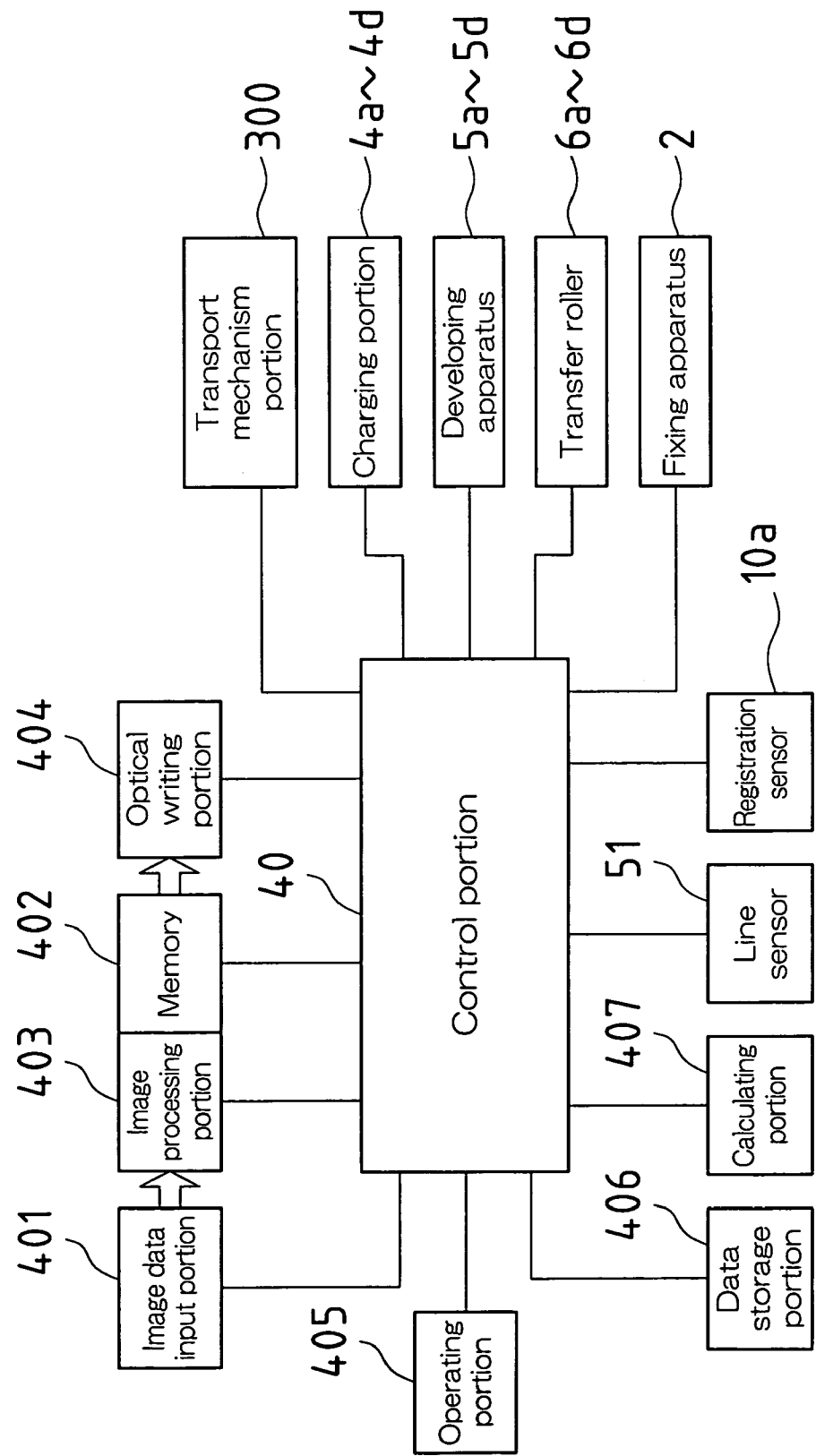
FIG. 4 is a block diagram that shows the configuration of the image forming system of the same image forming apparatus.

FIG. 4 is a block diagram that shows the configuration of the image forming system of the image forming apparatus X.

As shown in FIG. 4, the image forming system includes an image data input portion 401, an image processing portion 403 that has a memory portion 402, a optical writing portion 404, an operating portion 405, a data storage portion 406, a calculating portion 407, the line sensor 51, and the registration sensor 10*a*. In this image forming system, all portions are controlled by a control portion 40. This image forming system is further provided with the transport mechanism portion 300, the chargers 4*a* through 4*d*, the developing apparatuses 5*a* through 5*d*, the transfer rollers 6*a* through 6*d*, and the fixing apparatus 2.

A selector switch (not shown) is provided in the operating portion 405 that switches to a borderless image forming mode when forming a borderless image for the recording paper P. When switching to a borderless image forming mode with this selector switch, an electrostatic latent image larger than the size of the recording paper P whose edge position has been detected by the line sensor 51 is written on the first photosensitive drum 3*a* of the first image forming station S1. After detection of the edge position of the recording paper P by the line sensor 51, the size of the electrostatic latent image on the first photosensitive drum 3*a* to be transferred to the midstream of the recording paper P is changed based on the detection results by the line sensor 51 (the results of detecting the edge position of the recording paper P). Subsequent image formation on the recording paper P continues and is performed according to this electrostatic latent image (toner image) on the first photosensitive drum 3*a* whose size has been altered.

Figure 5:
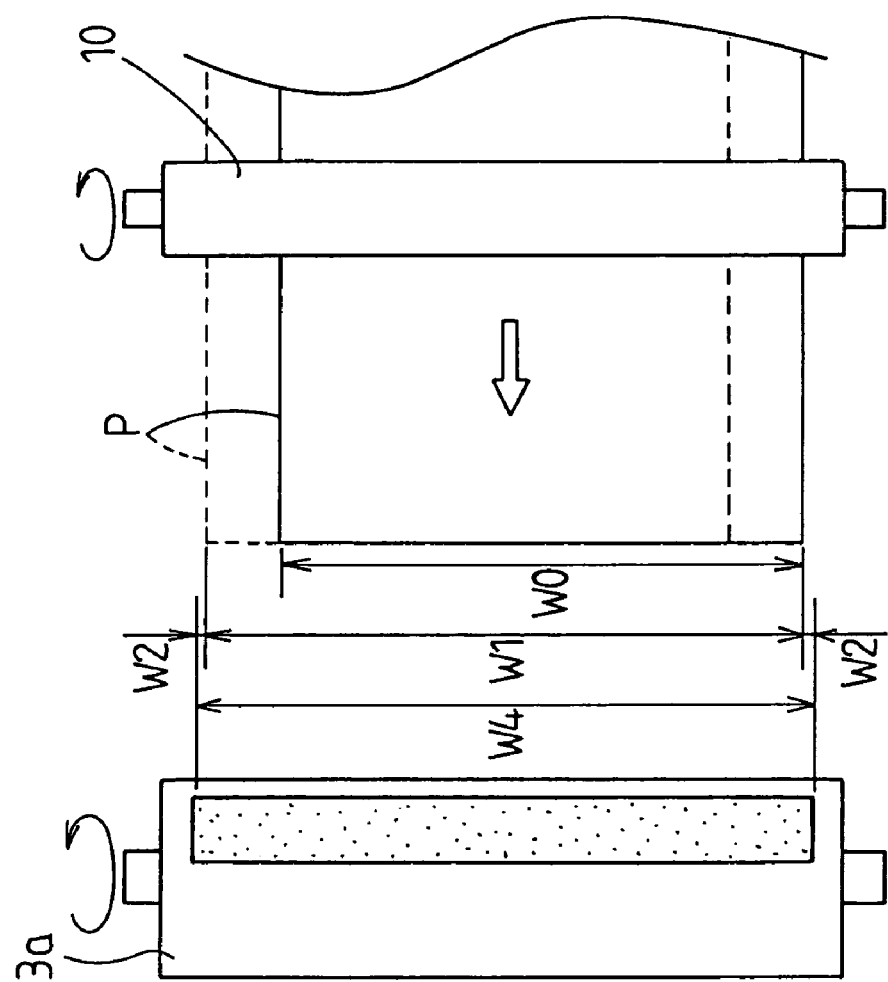
FIG. 5 is an explanatory diagram that illustrates the image forming region of the image formed on the same first photosensitive drum.
Figure 6:
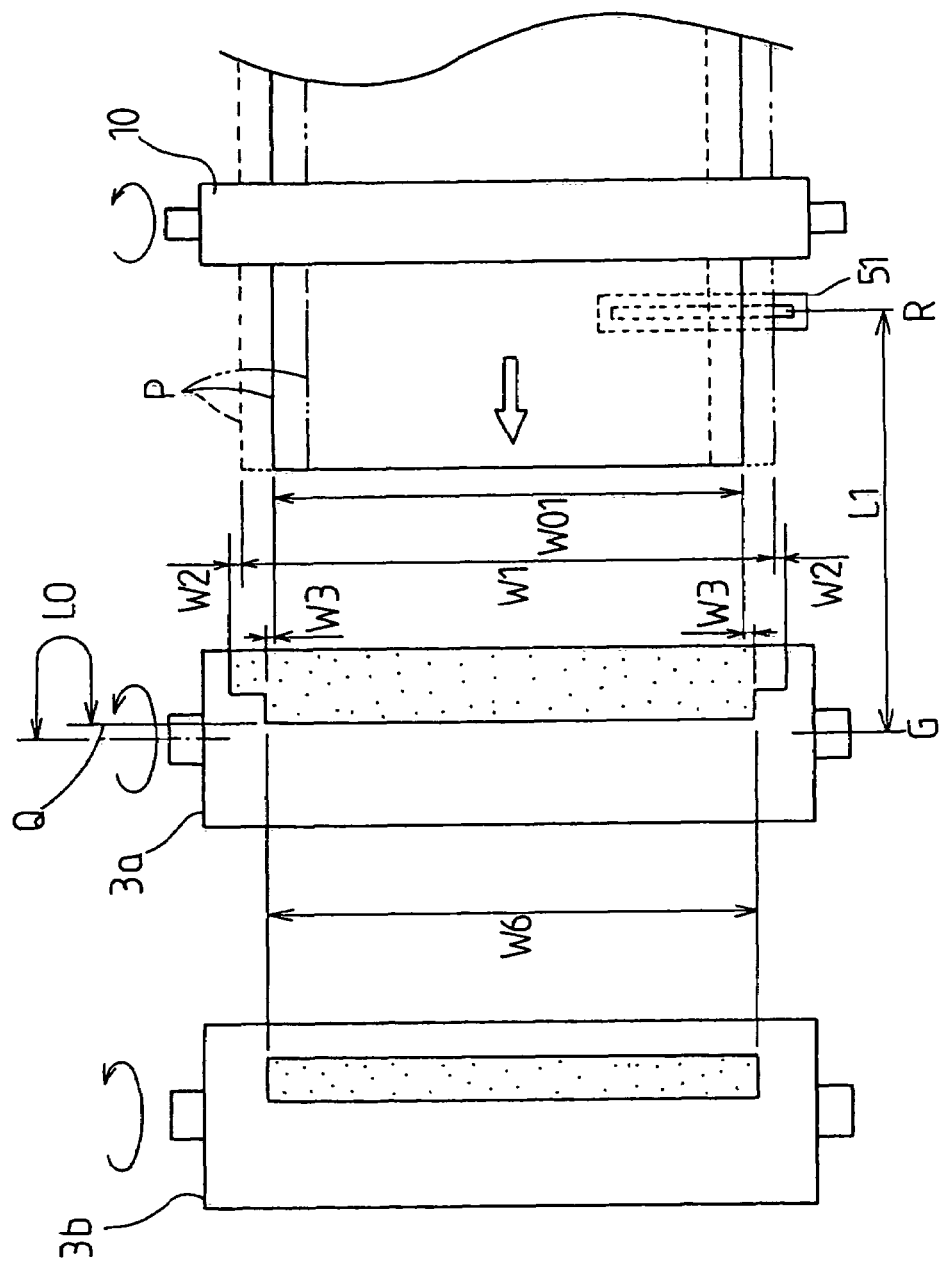
FIG. 6 is an explanatory diagram that illustrates the image forming region of the image formed on the same first and second photosensitive drums.

Specifically, as shown in FIG. 5, when the recording paper P of a width W0 (width in the left-right direction perpendicular to the recording paper transport direction) is transported and reaches the registration rollers 10, the transport tilt of the recording paper P in the paper transport path S is corrected by matching with the leading edge position of the registration rollers 10. Anticipating the corrected shift of the recording paper P due to that correction (shift between the solid line and broken line shown in FIG. 5), an effective width W1 in the direction perpendicular to the transport direction of the recording paper P is obtained. As shown in FIG. 6, adding margin values W2, W2 of about 1 mm to both ends of this effective width W1, an image forming region width W4 (W1+W2×2) in the lateral direction perpendicular to the recording paper transport direction is determined. After the electrostatic latent image of this image forming region width W4 in the lateral direction is written onto the first photosensitive drum 3a of the first image forming station S1 by the first exposing means 8a, it is developed by the first developing apparatus 5a and a toner image for the image forming region width W4 in the lateral direction is formed that is larger than the width W0 of the recording paper P. In this example, the position and magnification of the image on the recording paper P are determined by a preset value of the width W0 of the selected recording paper P and the image forming region width W4 in the lateral direction of the input electrostatic latent image, but a configuration is also possible wherein the position and magnification of the image on the recording paper P are determined automatically or manually according to operating guidance of the image forming apparatus X.

Figure 7:
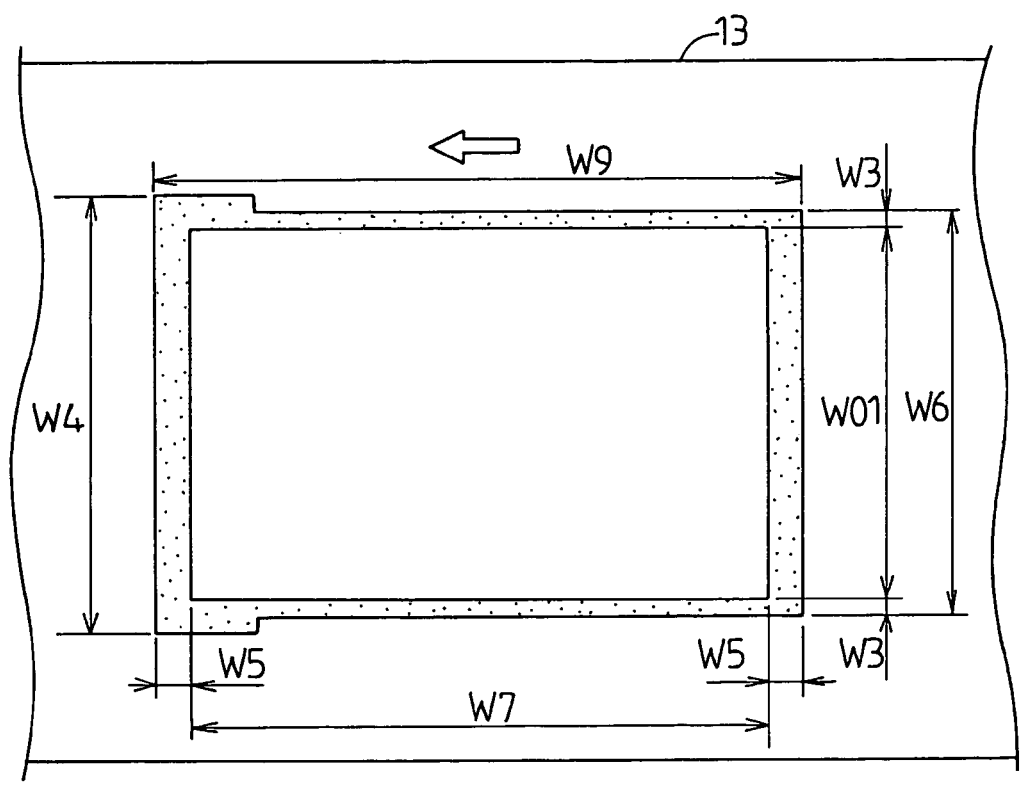
FIG. 7 is an explanatory diagram that illustrates the image forming region of the image on the first photosensitive drum that is changed before and after detection by the same line sensor.

This image forming region width W4 in the lateral direction of the toner image (electrostatic latent image) on the first photosensitive drum 3a of the first image forming station S1 is an initially set range in the lateral direction perpendicular to the recording paper transport direction, and is a value stored in advance in the data storage portion 406 for each size and type of the recording paper P. As shown in FIG. 7, W5 is a margin value for the transport direction (vertical direction) that includes a margin and start variation of the recording paper P due to the registration rollers 10, and this margin value W5 also is a value stored in advance in the data storage portion 406 for each size and type of the recording paper P. W7 is a default value for the length of the recording paper transport direction, and this default value W7 also is a value stored in advance in the data storage portion 406 for each size and type of the recording paper P. An image forming region length W9 (W7+W5×2) for the toner image (electrostatic latent image) on the first photosensitive drum 3a of the first image forming station S1 in the vertical direction parallel to the recording paper transport direction is determined by the margin value W5 for the recording paper transport direction and the default value W7 for the length of the recording paper P. These values are calculated from values set in advance, but the margin value W5 for the recording paper transport direction and the default value W7 for the length of the recording paper P may also by stored in advance in the data storage portion 406 for each size and type of the recording paper P.

An actual width W01 perpendicular to the transport direction of the recording paper P is obtained from the results of detecting the edge position of the recording paper P with the line sensor 51. An image forming region width W6 (W01+W3×2) in the lateral direction of the image (electrostatic latent image and toner image) on the first photosensitive drum 3a, which has been given a margin value W3 for both the left and right sides of that obtained actual width W01, is computed by a calculating portion 407. Before detecting the edge position of the recording paper P with the line sensor 51, the image forming region width W4 in the lateral direction of the electrostatic latent image (toner image developed by the first developing apparatus 5a) written onto the first photosensitive drum 3a by the first exposing means 8a is changed to the image forming region width W6 in the lateral direction of the electrostatic latent image based on the results of detecting the edge position of the recording paper P with the line sensor 51 while forming an image on the first photosensitive drum 3a, and an electrostatic latent image continues to be written onto the first photosensitive drum 3a by the first exposing means 8a. That is, before and after detecting the edge position of the recording paper P with the line sensor 51, the image forming region width in the lateral direction of the electrostatic latent image (toner image developed by the first developing apparatus 5a) written onto the first photosensitive drum 3a by the first exposing means 8a is changed such that it decreases from W4 to W6.

Figure 8:
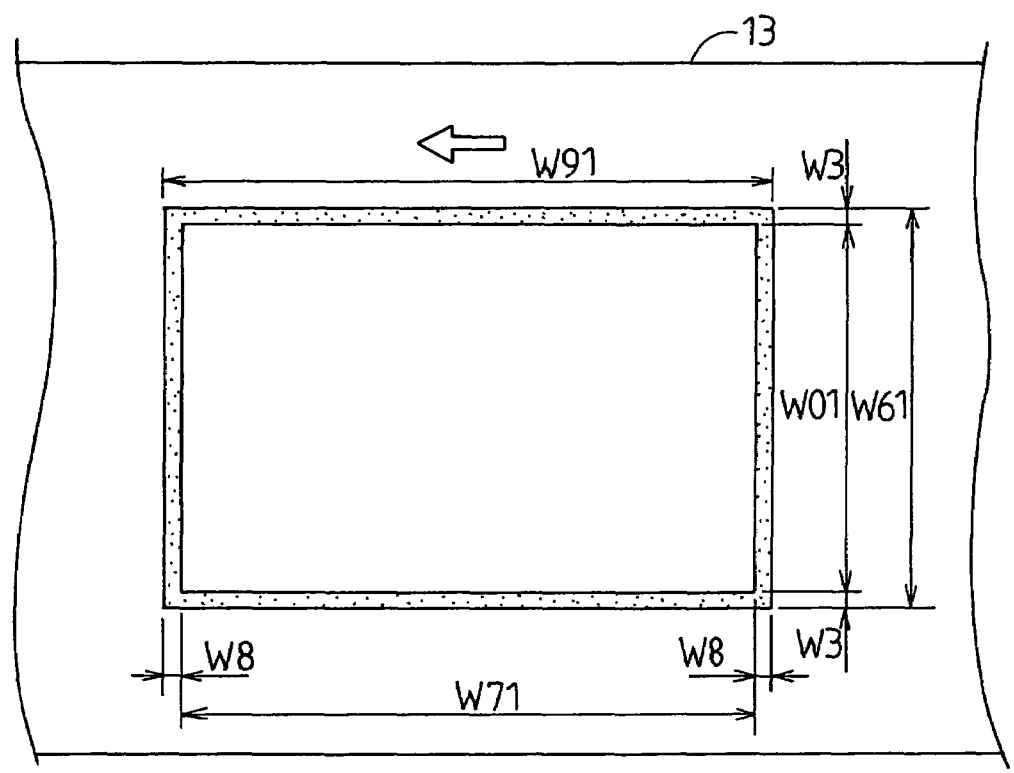
FIG. 8 is an explanatory diagram that illustrates the image forming region of the image on the second photosensitive drum that is changed before and after detection by the same line sensor.

The writing of the electrostatic latent image (image) to the photosensitive drums 3b through 3d by the exposing means 8b through 8d at the second to fourth image forming stations S2 through S4 on the downstream side in the recording paper transport direction relative to the first image forming station S1 is performed after detecting the edge position of the recording paper P with the line sensor 51, and as shown in FIG. 8, an image forming region width W61 in the lateral direction and an image forming region length W91 in the vertical direction of these photosensitive drums 3b through 3d are changed in advance and set before writing the electrostatic latent image by the exposing means 8b through 8d based on the results of detecting the edge position of the recording paper P with the line sensor 51.

Specifically, a default value W71 for the length in the vertical direction of the toner image (electrostatic latent image) on the photosensitive drums 3b through 3d of the second to fourth image forming stations S2 through S4 is a value obtained from a calculation based on the results of detecting the leading edge and trailing edge of the recording paper P with the line sensor 51, and the image forming region length W91 (W71+W8×2) in the vertical direction of the electrostatic latent image written to the photosensitive drums 3b through 3d is determined by adding a margin value W8 (for example, about 1 mm) to both the top and bottom of this default value W71 for the length in the vertical direction. On the other hand, the default value W01 for the length in the lateral direction of the toner image (electrostatic latent image) on the photosensitive drums 3b through 3d of the second to fourth image forming stations S2 through S4 is a value obtained from a calculation based on the results of detecting the leading edge and trailing edge of the recording paper P with the line sensor 51, and the image forming region width W61 (W01+W3×2) in the lateral direction of the electrostatic latent image written onto the photosensitive drums 3b through 3d is determined by adding a margin value W3 (for example, about 1 mm) to both the left and right sides of this default value W01 for the length in the lateral direction.

<Flowchart of Procedure for Changing the Image Forming Region of the Electrostatic Latent Image>

Figure 9:
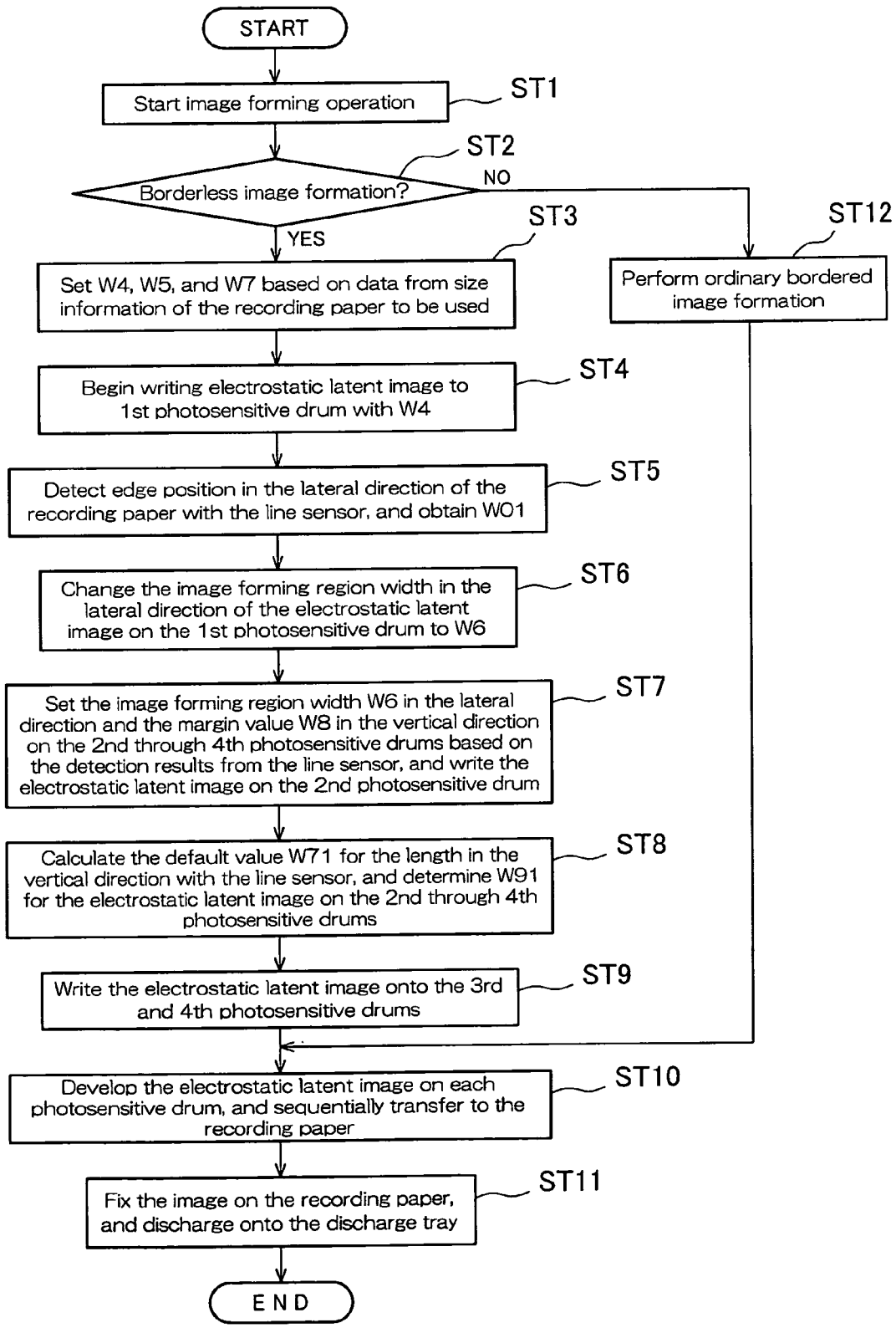
FIG. 9 is a flowchart that shows the procedure for changing the image forming region of the electrostatic latent image based on the detection results of the same line sensor.

The following is an explanation of the procedure for changing the image forming region of the electrostatic latent image based on the results of detecting the edge position of the recording paper P with the line sensor 51, with reference to the flowchart in FIG. 9.

First, after pushing the start button of the operating portion 405 and beginning the image forming operation in Step ST1 of the flowchart in FIG. 9, in Step ST2 it is judged whether or not a switch to the borderless image forming mode has been made by the selector switch. When this judgment of Step ST2 is NO, meaning that no switch has been made to the borderless image forming mode, the procedure proceeds to Step S12, and after performing ordinary bordered image formation, proceeds to Step ST10, described below.

When this judgment of Step ST2 is YES, meaning that a switch has been made to the borderless image forming mode, the image forming region width W4 in the lateral direction of the electrostatic latent image on the first photosensitive drum 3a of the first image forming station S1, the margin value W5 for the electrostatic latent image that includes margin and start variation of the recording paper P due to the registration rollers 10, and the default value W7 in the vertical direction of the recording paper transport direction of the electrostatic latent image are set based on the data stored in the data storage portion 406 according to the information of the size of recording paper P to be used.

Next, in Step ST4, writing of the electrostatic latent image to the first photosensitive drum 3a of the first image forming station S1 by the first exposing means 8a with the image forming region width W4 in the lateral direction begins.

Afterwards, in Step ST5, an edge position (either a left or right edge position) in a lateral direction parallel to the transport direction of the recording paper P is detected by the line sensor 51, and the actual width W01 in the lateral direction perpendicular to the transport direction of the recording paper P is obtained from the results of that detection. Then, in Step ST6, an image forming region width W6 in the lateral direction of the image (electrostatic latent image and toner image) on the first photosensitive drum 3a, which has been given a margin value W3 for both the left and right sides of the actual width W01 obtained in Step ST5, is computed by a calculating portion 407, and the image forming region width W4 in the lateral direction of the electrostatic latent image (toner image developed by the first developing apparatus 5a) written onto the first photosensitive drum 3a by the first exposing means 8a before detection of the edge position of the recording paper P by the line sensor 51 is changed to the image forming region width W6 in the lateral direction of the electrostatic latent image based on the results of detecting the edge position of the recording paper P with the line sensor 51 while forming an image on the first photosensitive drum 3a.

Afterwards, in Step ST7, the writing of the electrostatic latent image (image) to the photosensitive drums 3b through 3d at the second to fourth image forming stations S2 through S4 that are on the downstream side of the recording paper transport direction relative to the first image forming station S1 begins. As shown in FIG. 8, the image forming region width W61 in the lateral direction of these photosensitive drums 3b through 3d and the margin value W8 in the vertical direction are set based on the results of detecting the edge position of the recording paper P with the line sensor 51, and the writing of an electrostatic latent image onto the photosensitive drums 3b through 3d by the exposing means 8b through 8d is started.

Then, in Step ST8, the default value W71 for the length in the vertical direction of the electrostatic latent image (toner image) on the photosensitive drums 3b through 3d of the second to fourth image forming stations S2 through S4 is calculated from the results of detecting the leading edge and trailing edge of the recording paper P with the line sensor 51, and the image forming region length W91 (W71+W8×2) in the vertical direction of the electrostatic latent image written to the second photosensitive drum 3b of the second image forming station S2 is determined by adding a margin value W8 (for example, about 1 mm) to both the top and bottom of this default value W71 for the length in the vertical direction. Next, in Step ST9, an electrostatic latent image is written to the photosensitive drums 3c and 3d of the third and fourth image forming stations S3 and S4 by the exposing means 8c and 8d, with the image forming region width W61 in the lateral direction and the image forming region length W91 in the vertical direction as set in the second image forming station S2 and written to the second photosensitive drum 3b.

Afterward, in Step ST10, the electrostatic latent images written to the photosensitive drums 3a through 3d of the image forming stations S1 through S4 are developed into toner images by the developing apparatuses 5a through 5d, and after transferring them in order to the recording paper P on the transfer/transport belt 13, in Step ST11 the images of the recording paper P are fixed by the fixing apparatus after they have been transferred and then discharged onto the discharge trays 17 and 18.

<Timing Chart for Writing the Electrostatic Latent Image>

Next, the timing for writing the electrostatic latent image onto the photosensitive drums 3a through 3d of the image forming stations S1 through S4, the cut-off timing for a registration roller clutch that cuts off driving force to the registration rollers 10, the timing for detecting the edge position of the recording paper P with the line sensor 51, and the timing for detection with the registration sensor 10a are explained with reference to the timing chart in FIG. 10.

Figure 10:
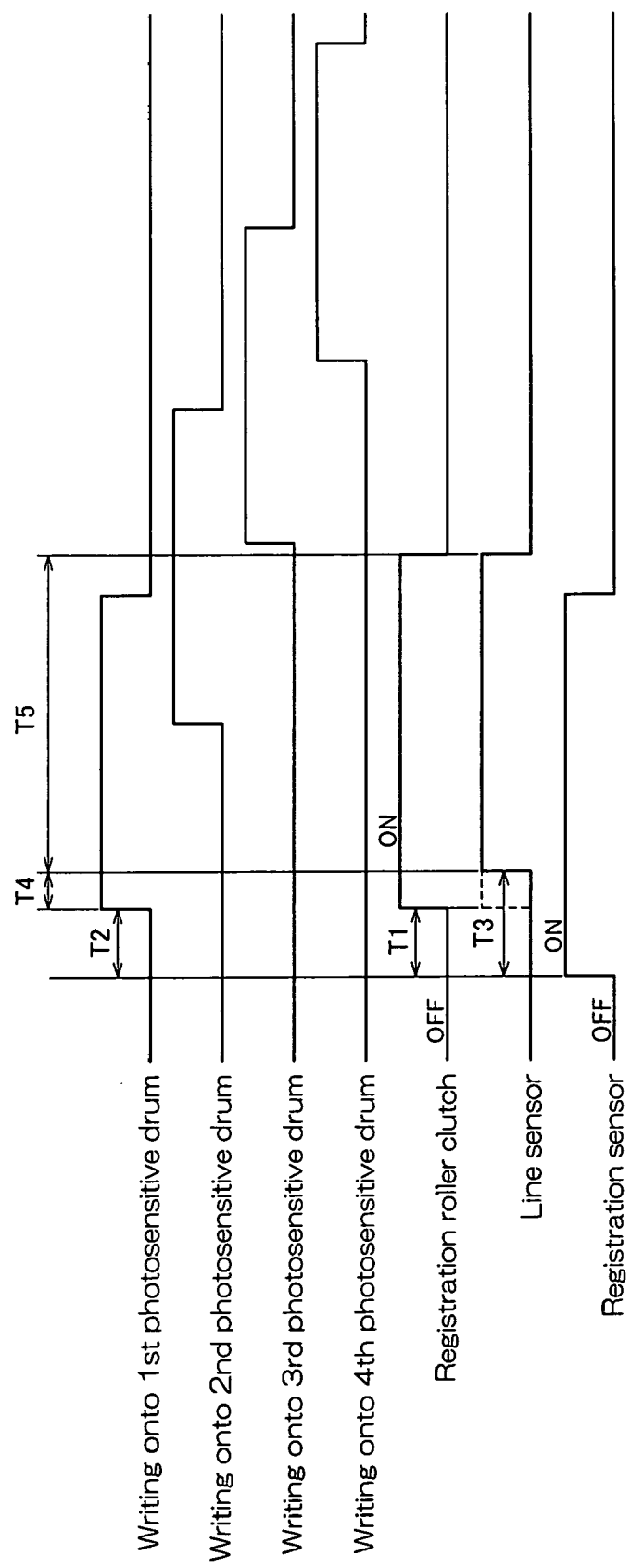
FIG. 10 is a timing chart that shows the timing for writing the electrostatic latent image onto the same photosensitive drums, the cut-off timing for the registration roller clutch, the detection timing of the line sensor, and the detection timing of the registration sensor.

In the timing chart of FIG. 10, the writing of the electrostatic latent image onto the first photosensitive drum 3a of the first image forming station S1 is begun at about the same time as connection of the registration roller clutch (ON), which occurs at T2 seconds after the point in time that detection with the registration sensor 10a begins (ON). T4 seconds after the start of writing the electrostatic latent image onto the first photosensitive drum 3a of the first image forming station S1, that is, after detecting the edge position (both left and right edge positions) parallel to the transport direction of the recording paper P with the line sensor 51 (T3 seconds after beginning detection with the registration sensor 10a), the image forming region width W4 in the lateral direction of the electrostatic latent image written onto the first photosensitive drum 3a by the first exposing means 8a before detection of the edge position of the recording paper P by the line sensor 51 is changed to the image forming region width W6 in the lateral direction of the electrostatic latent image based on the results of detecting the edge position of the recording paper P with the line sensor 51 while forming an image on the first photosensitive drum 3a.

The writing of the electrostatic latent image (image) to the photosensitive drums 3b through 3d by the exposing means 8b through 8d at the second to fourth image forming stations S2 through S4 is performed in sequence at predetermined time intervals after detecting the edge position of the recording paper P with the line sensor 51, progressing T4 seconds from the beginning of writing the electrostatic latent image onto the first photosensitive drum 3a of the first image forming station S1. That is, an image forming region width W61 in the lateral direction and an image forming region length W91 in the vertical direction of the photosensitive drums 3b through 3d on the second to fourth image forming stations S2 through S4 are changed in advance and then set before writing the electrostatic latent image by the exposing means 8b through 8d based on the results of detecting the edge position of the recording paper P with the line sensor 51.

In this case, the broken line for the reading timing of the line sensor 51 indicates that the reading of the line sensor 51 is begun at the same time as connection of the registration roller clutch (ON), which occurs at T1 seconds after the point in time that detection with the registration sensor 10a begins (ON). The solid line for the reading timing of the line sensor 51 indicates the time that the recording paper P transported on the transfer/transport belt 13 is actually read by the line sensor 51. The connection of the registration roller clutch is cut off (OFF) at the point in time that the edge position of the trailing edge portion of the recording paper P is detected by this line sensor 51 (T5 seconds after the point in time that the edge position of the leading edge portion is detected). In this first embodiment, detection of the edge position of the recording paper P by the line sensor 51 is continuously performed until the trailing edge of the recording paper P on the transfer/transport belt 13, but the invention is not restricted to such a configuration; a configuration may also be adopted wherein only the necessary portions are detected by the line sensor 51. That is, a configuration may also be adopted wherein, according to the size of the selected recording paper, by performing detection only at least twice, for the leading edge portion and the trailing edge portion of the recording paper, the leading edge passage timing of the recording paper, the edge position (position of both left and right edges) parallel to the transport direction, and the trailing edge passage timing are detected.

In a tandem image forming apparatus X such as that of this first embodiment, color shift when forming a multi-color image is a serious problem and decreases image quality, but color registration (color matching) correction control is performed such that this decreased image quality is diminished and good image quality can be obtained. That is, data for a standard photosensitive drum (for example, the first photosensitive drum 3*a* that is furthest upstream) that corrects the image forming position (timing) of the other photosensitive drums 3*b* through 3*d* is stored in advance in the data storage portion 406 of the image forming apparatus X. The position of the image formed on each of the photosensitive drums 3*b* through 3*d* is corrected based on that data, and image formation is controlled such that the image formed on the photosensitive drums 3*a* through 3*d* is correctly layered without the image shifting and color shift does not occur.

Accordingly, in the above first embodiment, when switching to the borderless image forming mode with the selector switch of the operating portion 405, writing of an electrostatic latent image larger than the size of the recording paper P onto the first photosensitive drum 3*a* of the first image forming station S1 begins. When the edge position of the recording paper P is detected by the line sensor 51, the size of the electrostatic latent image on the first photosensitive drum 3*a* transferred to the recording paper P is changed during the operation based on the detection results by the line sensor 51 (the results of detecting the edge position of the recording paper P). Subsequent image formation on the recording paper P is performed according to the electrostatic latent image (toner image) on the first photosensitive drum 3*a* whose size has been changed. Specifically, as shown in FIG. 5, when the recording paper P of width W0 is transported and the leading edge is corrected by the registration rollers 10, the effective width W1 of the recording paper P is obtained in anticipation of the corrected shift of the recording paper P due to that correction. As shown in FIG. 6, the image forming region width W4 (W1+W2×2) in the lateral direction of the recording paper, to which the margin values W2, W2 of about 1 mm have been added to both sides of this effective width W1, is determined, and writing of an electrostatic latent image with this image forming region width W4 in the lateral direction onto the first photosensitive drum 3*a* of the first image forming station S1 by the first exposing means 8*a* begins. As shown in FIG. 7, when the actual width W0 of the recording paper P is obtained from the results of detecting the edge position of the recording paper P with the line sensor 51, the image forming region width W6 in the lateral direction of the image (electrostatic latent image and toner image) on the first photosensitive drum 3*a*, to which the margin value W3 has been given to both the left and right sides of that obtained actual width W0, is computed by the calculating portion 407. The image forming region width W4 in the lateral direction of the electrostatic latent image (the toner image developed by the first developing apparatus 5*a*) written onto the first photosensitive drum 3*a* by the first exposing means 8*a* before detection of the edge position of the recording paper P by the line sensor 51 is changed to the image forming region width W6 in the lateral direction of the electrostatic latent image based on the results of detecting the edge position of the recording paper P with the line sensor 51 during image formation on the first photosensitive drum 3*a*, and an electrostatic latent image continues to be written onto the first photosensitive drum 3*a* by the first exposing means 8*a*. That is, the image forming region width in the lateral direction of the electrostatic latent image written onto the first photosensitive drum 3*a* by the first exposing means 8*a* (the toner image developed by the first developing apparatus 5*a*) is changed such that it decreases before and after detection of the edge position of the recording paper P by the line sensor 51. Thus, before detection by the line sensor 51, even if detection of the edge position of the recording paper P is not performed, with the toner image (electrostatic latent image) on the first photosensitive drum 3*a* that is larger than the size of the recording paper P it is possible to transfer a good image onto the recording paper P without causing image loss due to transport shift of the recording paper P. On the other hand, after detection by the line sensor 51, even if determination of the size of the image on the first photosensitive drum 3*a* is not performed in time, the size of the toner image on the first photosensitive drum 3*a* is changed to a size conforming to the edge position of the recording paper P based on the results of detecting the edge position of the recording paper P. Thus, the amount of toner recovered by the cleaning apparatus 7*a* after not being transferred to the recording paper P can be decreased as much as possible, and in addition to economically consuming toner by suppressing toner waste, it is possible to extend the cycle until recovered toner is full. In the cleaning apparatus 7*a* as well, in which a container that contains the recovered toner is integrated, partial accumulation of the recovered toner in the container is suppressed and it is possible to prevent poor cleaning due to a portion of the recovered toner leaking out.

By writing the electrostatic latent image onto the first photosensitive drum 3*a* with the first exposing means 8*a* before detection of the edge position of the recording paper P by the line sensor 51, it is possible to provide the line sensor 51 closer to the transfer point G. The transport distance L1 from detection point R at which the edge position of the recording paper P is detected by the line sensor 51 to the transfer point G is shortened in the transport direction of the recording paper P, and in addition to being able to achieve a more compact image forming apparatus X, it is possible to shorten the time necessary for image formation.

Because the line sensor 51 is provided immediately downstream of the registration rollers 10 such that transport tilt of the recording paper P is corrected before detection of the edge position of the recording paper P by the line sensor 51, tilted transport of the recording paper P transported towards the transfer point G is corrected by the registration rollers 10. Thus, by detecting the edge position of the recording paper P with the line sensor 51 in an approximately straight transport state, in addition to detecting the edge position of the recording paper P with high precision, the image allowed to have some margin on the first photosensitive drum 3*a*, formed before detection of the edge position of the recording paper P by the line sensor 51, becomes as small as possible. Thus this configuration is very advantageous for reducing the amount of wasted toner recovered after not being transferred to the recording paper P.

Furthermore, because the distance L1 from the detection point R detected by the line sensor 51 to the transfer point G is set shorter than the distance L0 from the writing point Q of the electrostatic latent image to the first photosensitive drum 3a to the transfer point G, detection of the edge position of the recording paper P by the line sensor 51 can be performed at an early stage. By quickly changing the size of the electrostatic latent image on the first photosensitive drum 3a based on the detection results after detecting the edge position of the recording paper P with the line sensor 51, it is possible to effectively decrease the amount of wasted toner that is recovered after not being transferred to the recording paper P.

The size of the electrostatic latent image written onto the first photosensitive drum 3a by the first exposing means 8a during image formation subsequent to detection of the edge position of the recording paper P by the line sensor 51 is changed at the first photosensitive drum 3a of the first image forming station S1 positioned furthest upstream in the transport direction of the recording paper P. However, at photosensitive drums 3b through 3d of the second to fourth image forming stations S2 through S4 that are further downstream in the transport direction, before writing the electrostatic latent image to each of the photosensitive bodies 3b through 3d by the exposing means 8b through 8d, an electrostatic latent image is written that has a size (a size with as little margin as possible) based on the results of detecting the edge position of the recording paper P with the line sensor 51. Thus, the amount of wasted toner that is recovered after not being transferred to the recording paper P is effectively reduced at the cleaning apparatuses 7b through 7d of the second to fourth image forming stations S2 through S4, and it is possible to dramatically lengthen the cycle until the container in the cleaning apparatuses 7b through 7d is full.

Data that corrects the image forming positions (timing) of the other photosensitive drums 3b through 3d with respect to a standard photosensitive drum (for example, the first photosensitive drum 3a that is furthest upstream) is stored in advance in the data storage portion 406 of the image forming apparatus X. The position of the image formed on each of the photosensitive drums 3b through 3d is corrected based on that data, and image formation is controlled such that the image formed on the photosensitive drums 3a through 3d is correctly layered without the image shifting, so that color shifting does not occur. Thus, by also setting the range of the image formed on each of the photosensitive drums 3a through 3d based on the data for the transport timing and transport position of the recording paper P obtained with the line sensor 51 and the correction data for color registration, it is possible to set a small amount of margin for the range in which an image is formed, without influence by positional shifts of the photosensitive drums 3a through 3d, positional shifts of the writing of the electrostatic latent image onto the photosensitive drums 3b through 3d by the exposing means 8b through 8d, transport tilt of the transfer/transport belt 13 or the like.

Further, because the position and magnification of the image on the recording paper P are set from the default value of the width W0 of the selected recording paper P and the image forming region width W4 in the lateral direction of the input electrostatic latent image, if the position or magnification is changed when the range for writing the electrostatic latent image onto the first photosensitive drum 3a is changed during image formation on the recording paper P, image continuity is lost or the image is distorted, but if the position or magnification of the image is set based on data prescribed in advance, good image formation can be performed.

In the first embodiment described above, black toner is contained in the first developing apparatus 5a of the first image forming station S1, cyan toner is contained in the second developing apparatus 5b of the second image forming station S2, magenta toner is contained in the third developing apparatus 5c of the third image forming station S3, and yellow toner is contained in the fourth developing apparatus 5d of the fourth image forming station S4, but this is only one example. Black toner, cyan toner, magenta toner, and yellow toner may be contained in the developing apparatus of the image forming stations in any order.

Second Embodiment

In the first embodiment described above, the line sensor 51 detects only the edge position of the recording paper P. This can be changed such that the edge position of the recording paper P is detected at two locations in the recording paper transport direction, making it possible to detect a skew state of the recording paper P, as described below as a second embodiment. Parts that are the same as in the first embodiment are given the same reference numerals, and primarily the differing points of this second embodiment are explained.

Figure 11:
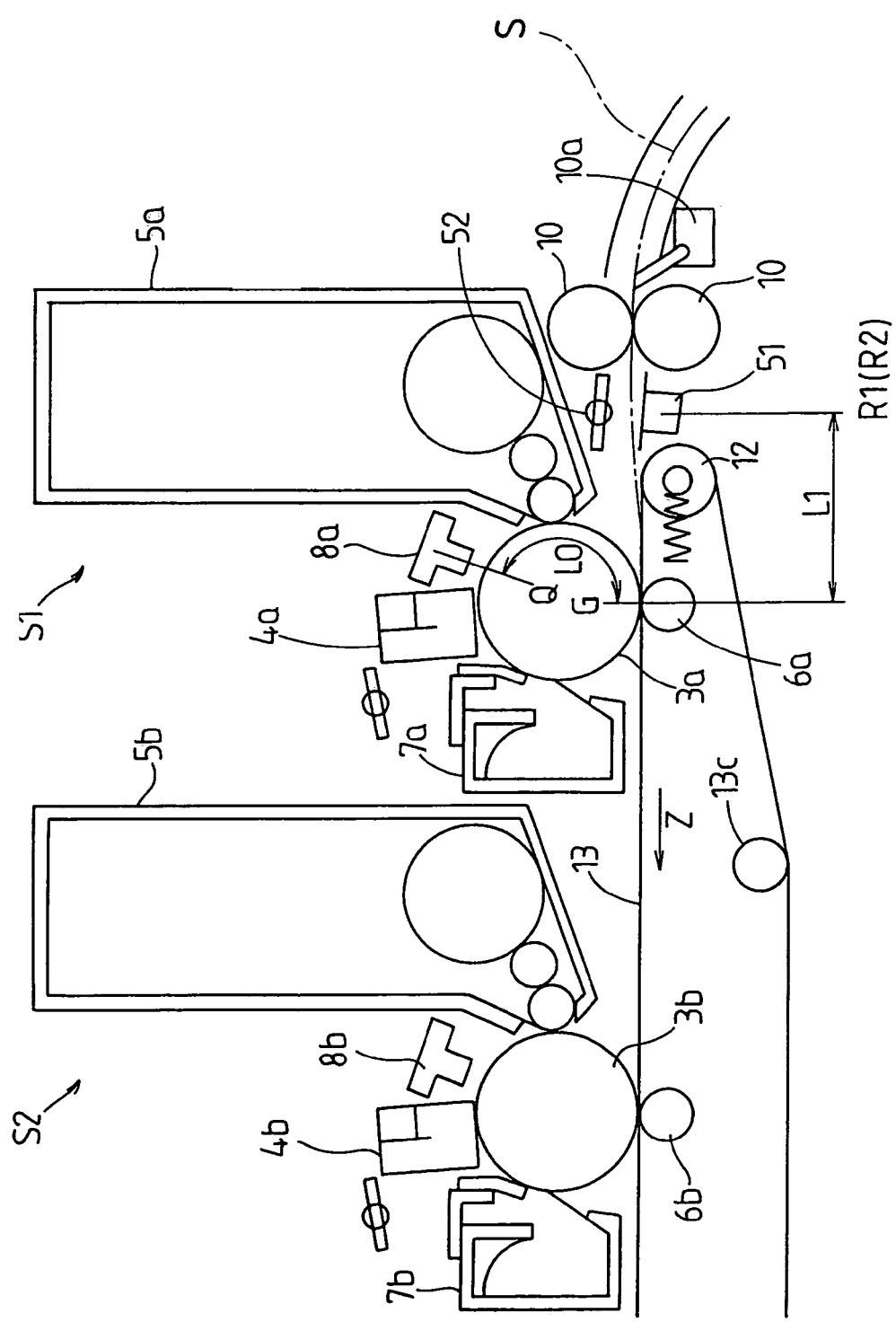
FIG. 11 is a schematic diagram that shows the configuration of the vicinity of the first and second photosensitive drums of the image forming apparatus employing an electrophotographic system associated with a second embodiment of the present invention.
Figure 12:
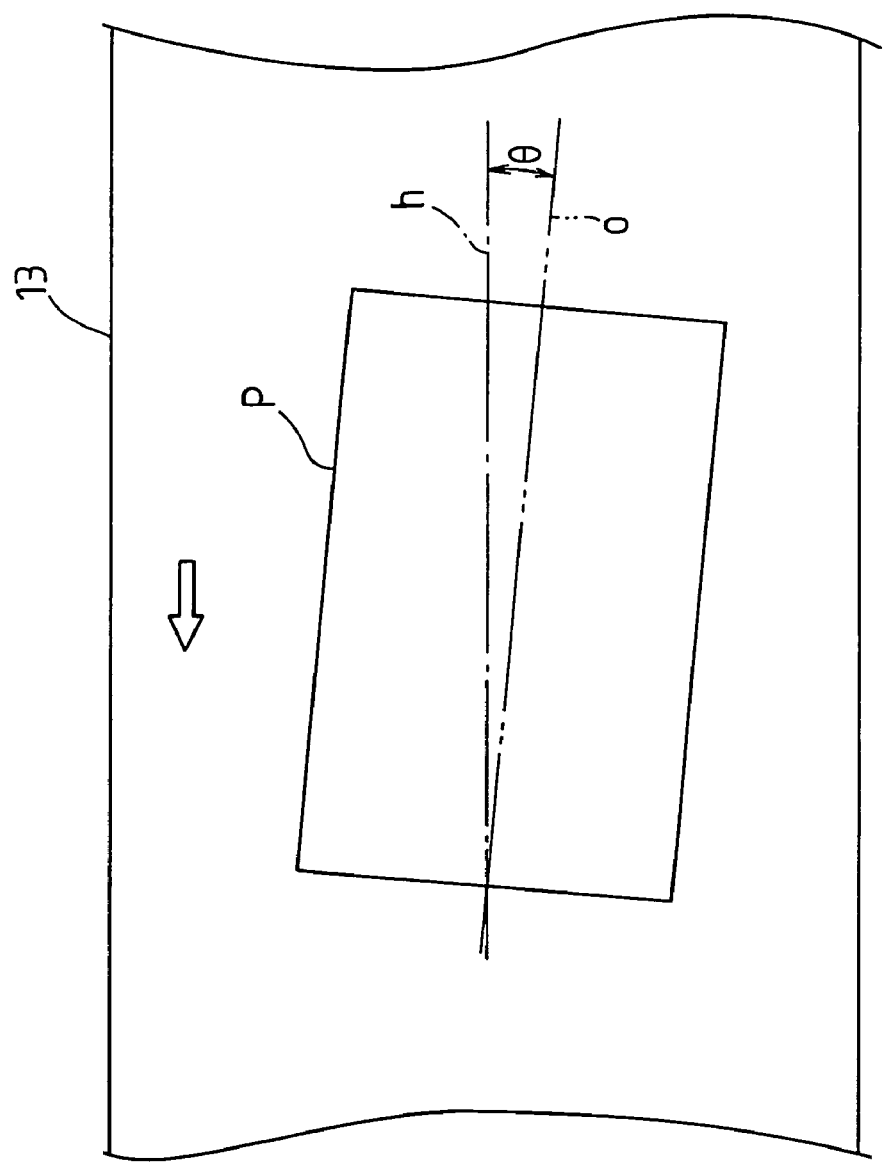
FIG. 12 is a plan view that illustrates a skew state of identical recording paper, viewing the transfer/transport belt from above.

FIG. 11 is a schematic view that shows the configuration of the vicinity of the first and second photosensitive drums in the second embodiment. FIG. 12 is a plan view that illustrates a skew state of the recording paper, viewed from above the transfer/transport belt.

The line sensor 51 detects the edge position of the recording paper P transported towards the transfer point G at two locations in the paper transport direction (including the initial first detection point R1 of the edge position of the recording paper P). Thus, as shown in FIG. 12, a skew state of the recording paper P is detected from the tilt angle θ of a center line "o" parallel to either the left or right edge of the recording paper P (in the vicinity parallel to the transport direction) relative to a parallel line "h" parallel to the recording paper transport direction. In this case, the tilt angle θ of the recording paper is calculated by a control portion 40a (see FIG. 13) based on the first and second detection interval (time difference); the results of that first and second detection, in other words the results of reading the edge position of either the left or right of the recording paper P (position); and the transport speed of the recording paper P.

Also, as shown in FIG. 11, the distance L1 from the initial first detection point R1 of the edge position of the recording paper P detected by the line sensor 51 to the transfer point G is set shorter than the distance L0 from the writing point Q of the electrostatic latent image (image) on the first photosensitive drum 3a of the first image forming station S1 by the first exposing means 8a to the transfer point G.

<Configuration of Image Forming System>

Figure 13:
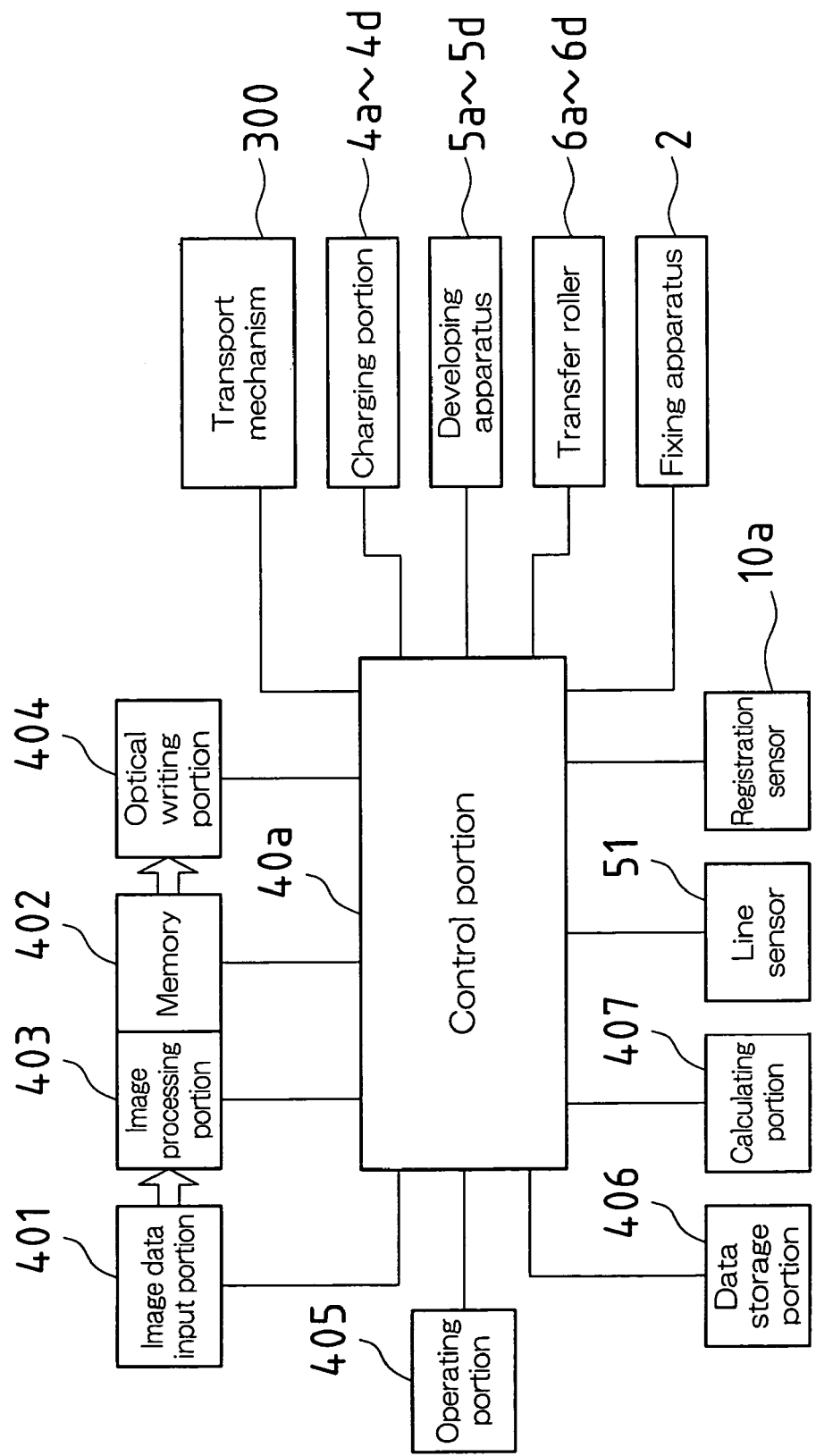
FIG. 13 is a block diagram that shows the configuration of the image forming system of the same image forming apparatus.

FIG. 13 is a block diagram that shows the configuration of the image forming system of the image forming apparatus X of the second embodiment. The control portion 40a is the only point of difference with FIG. 4, which shows the first embodiment.

An electrostatic latent image larger than the size of the recording paper P transported towards the transfer point G by the transfer/transport belt 13 starts to be written onto the first photosensitive drum 3a of the first image forming station S1 when the selector switch (not shown) for switching to a borderless image forming mode provided in the operating portion 405 switches to the borderless image forming mode. When the skew state and edge position of the recording paper P are detected by the line sensor 51, the size of the electrostatic latent image on the first photosensitive drum 3a transferred to the recording paper P afterwards is changed during the operation based on the results of detecting the skew state and edge position of the recording paper P with the line sensor 51. Subsequent image formation on the recording paper P continues to be performed according to this electrostatic latent image (toner image) on the first photosensitive drum 3*a* whose size has been changed.

Figure 14:
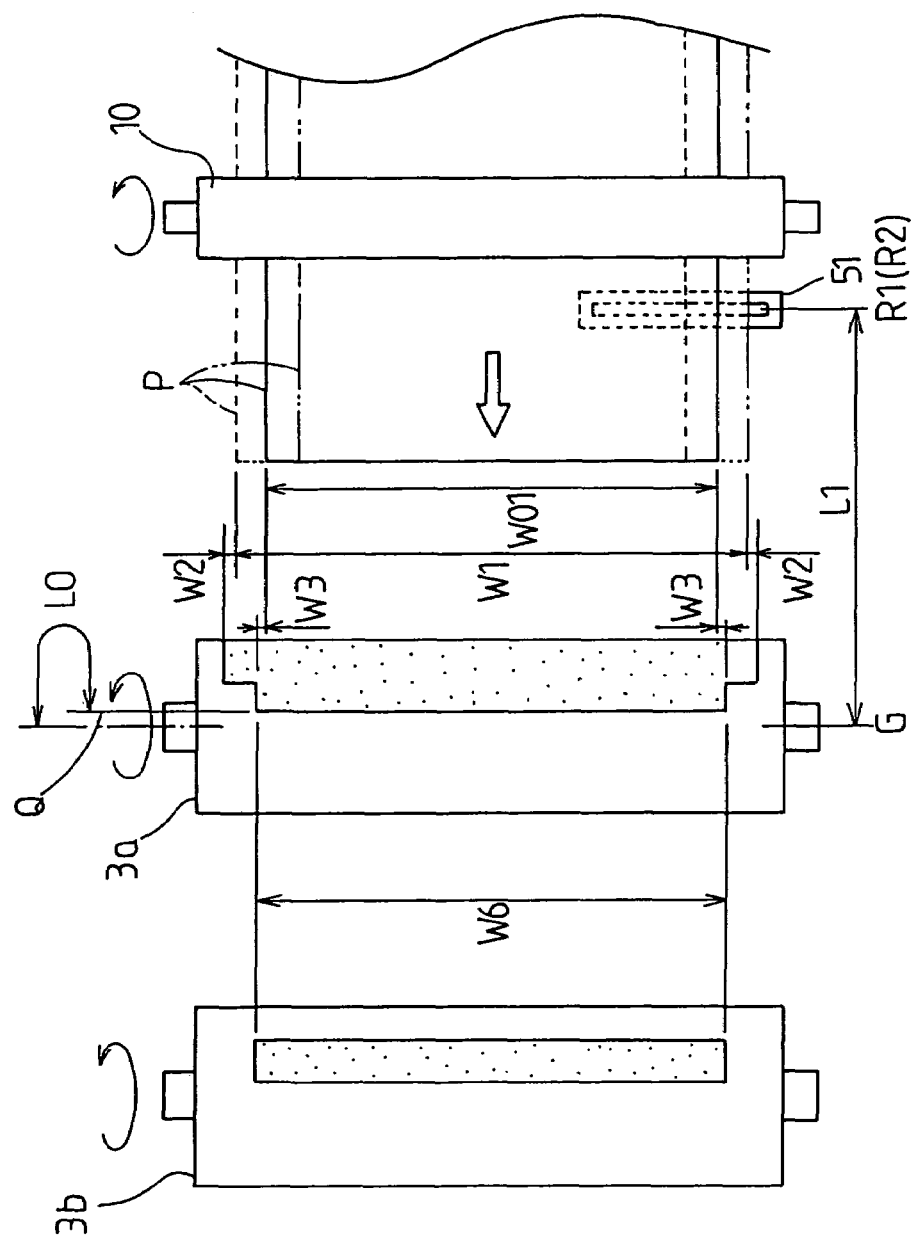
FIG. 14 is an explanatory diagram that illustrates the image forming region of the image formed on the same first and second photosensitive drums.

Specifically, as shown in FIG. 5 and FIG. 14, when recording paper of width W0 (width in the left/right direction perpendicular to the recording paper transport direction) is transported and reaches the registration rollers 10, transport tilt of the recording paper P in the paper transport path S is corrected by matching the registration rollers 10 with the leading edge position of the recording paper. Anticipating the corrected shift of the recording paper P due to that correction (the shift between the double-dashed line and the broken line shown in FIG. 14), the effective width W1 (including shift wherein the transport position is shifted when correcting the recording paper P transported to the registration rollers 10, and considering of the remaining skew state of the recording paper P which has not been corrected by the registration rollers 10) in the direction perpendicular to the transport direction of the recording paper P is obtained. Adding the margin values W2, W2 of about 1 mm to both the left and right sides of this effective width W1, the image forming region width W4 (W1+W2×2) in the lateral direction perpendicular to the recording paper transport direction is determined. Writing of an electrostatic latent image with this image forming region width W4 in the lateral direction onto the first photosensitive drum 3*a* of the first image forming station S1 is begun by the first exposing means 8*a*, and developed by the first developing apparatus 5*a*, begins to form a toner image of image forming region width W4 in the lateral direction larger than the width W0 of the recording paper P. Here, the position and magnification of the image on the recording paper P are set from the default value of the width W0 of the selected recording paper P and the image forming region width W4 in the lateral direction of the input electrostatic latent image, but a configuration may also be adopted wherein the position and magnification of the image on the recording paper P are set automatically or manually according to operating guidance of the image forming apparatus X.

Figure 15:
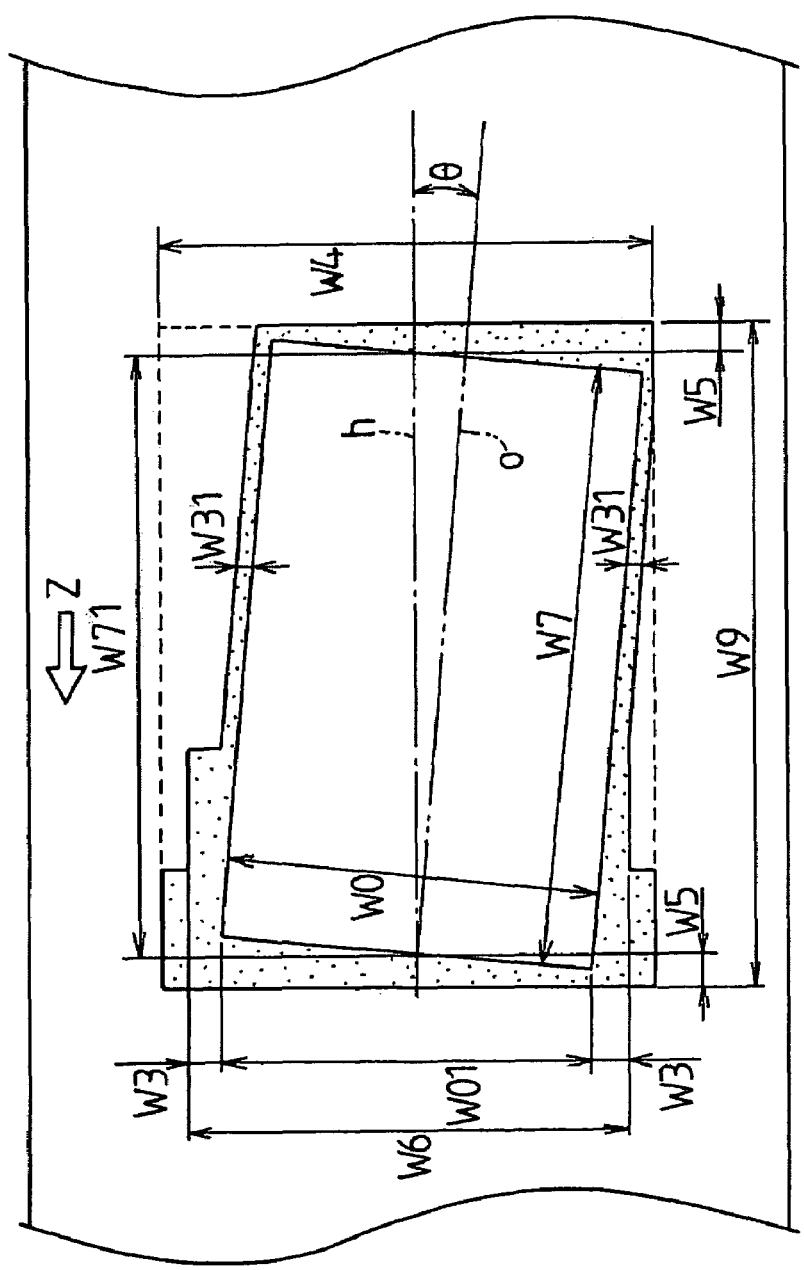
FIG. 15 is an explanatory diagram that illustrates the image forming region of the image formed on the first photosensitive drum that is changed before and after detection by the same line sensor.

This image forming region width W4 in the lateral direction of the toner image (electrostatic latent image) on the first photosensitive drum 3*a* of the first image forming station S1 is an initially set range in the lateral direction perpendicular to the recording paper transport direction, and is a value stored in advance in the data storage portion 406 for each size and type of the recording paper P. As shown in FIG. 15, W5 is a margin value for the top and bottom of the transport direction (vertical direction) including start variation and margin of the recording paper P due to the registration rollers 10, and this margin value W5 is also stored in advance in the data storage portion 406 for each size and type of the recording paper P. W7 is a default value for the length of the transport direction of the recording paper P, and this default value W7 for the length of the recording paper P is also stored in advance in the data storage portion 406 for each size and type of the recording paper P. W71 is a default value wherein the default value W7 for the length of the recording paper P has been converted to a component of length parallel to the recording paper transport direction. The image forming region length W9 (W71+W5×2) in the vertical direction parallel to the recording paper transport direction of the toner image (electrostatic latent image) on the first photosensitive drum. 3*a* of the first image forming station S1 is determined from the margin value W5 in the recording paper transport direction and the default value W71 of the length parallel to the transport direction of the recording paper P. These values are calculated from values prescribed in advance, but the margin value W5 in the recording paper transport direction and the default value W7 for the length of the recording paper P may also be stored in advance in the data storage portion 406 for each size and type of the recording paper P.

The actual width W01 perpendicular to the transport direction of the recording paper P is obtained from the results of detecting the edge position of the recording paper P at the first detection point R1 with the line sensor 51. The image forming region width W6 (W01+W3×2) in the lateral direction of the image (electrostatic latent image and toner image) on the first photosensitive drum 3*a*, to which the margin value W3 has been given to both the left and right sides of that actual width W01, is computed by the calculating portion 407. Before detection of the edge position of the recording paper P at the first detection point R1 by the line sensor 51, the image forming region width W4 in the lateral direction of the electrostatic latent image (toner image developed by the first developing apparatus 5*a*) written onto the first photosensitive drum 3*a* by the first exposing means 8*a* is changed to the image forming region width W6 in the lateral direction of the electrostatic latent image based on the results of detecting the edge position of the recording paper P at the first detection point R1 with the line sensor 51 during image formation on the first photosensitive drum 3*a*, and an electrostatic latent image continues to be written onto the first photosensitive drum 3*a* by the first exposing means 8*a*. That is, before and after detection of the edge position of the recording paper P at the first detection point R1 by the line sensor 51, the image forming region width in the lateral direction of the electrostatic latent image (toner image developed by the first developing apparatus 5*a*) written onto the first photosensitive drum 3*a* by the first exposing means 8*a* is changed such that it decreases from W4 to W6.

After a predetermined time has passed following detection of the edge position of the recording paper P at the first detection point R1 by the line sensor 51, when the results of detection at the next second detection point R2 are obtained, the tilt angle θ of the recording paper P is calculated by the control portion 40*a*, and a skew state of the recording paper P is detected from this tilt angle θ, based on the results of detection at that second detection point R2 and detection at the first detection point R1 (results of reading either the left or right edge of the recording paper P), the detection interval (prescribed time difference) of the first detection point R1 and the second detection point R2 with the line sensor 51, and the transport speed of the recording paper P. That is, when the tilt angle θ of the recording paper P is calculated from the results of detecting the edge position of the recording paper P at the second detection point R2 with the line sensor 51 and a skew state of the recording paper P is detected, the margin value W3 in the lateral direction of the electrostatic latent image (the toner image developed by the first developing apparatus 5*a*) that has been written onto the first photosensitive drum 3*a* by the first exposing means 8*a* before detection of the edge position of the recording paper P at the second detection point R2 by the line sensor 51 (before detection of a skew state of the recording paper P), while being changed to a smaller margin value W31 (for example, about 1 mm) based on the results of detecting a skew state, is matched to the tilt angle θ of the recording paper P and controlled such that it shifts in the lateral direction (main scanning direction), and an electrostatic latent image continues to be written onto the first photosensitive drum 3*a* by the first exposing means 8*a*. In other words, before and after detection of a skew state of the recording paper P by the line sensor 51, while changing the margin value in the lateral direction of the electrostatic latent image (toner image developed by the first developing apparatus 5*a*) written onto the first photosensitive drum 3*a* by the first exposing means 8a such that the margin value decreases from W3 to W31, the margin value is controlled such that it matches the tilt angle θ of the recording paper P and is shifted in the lateral direction (the main scanning direction).

Figure 16:
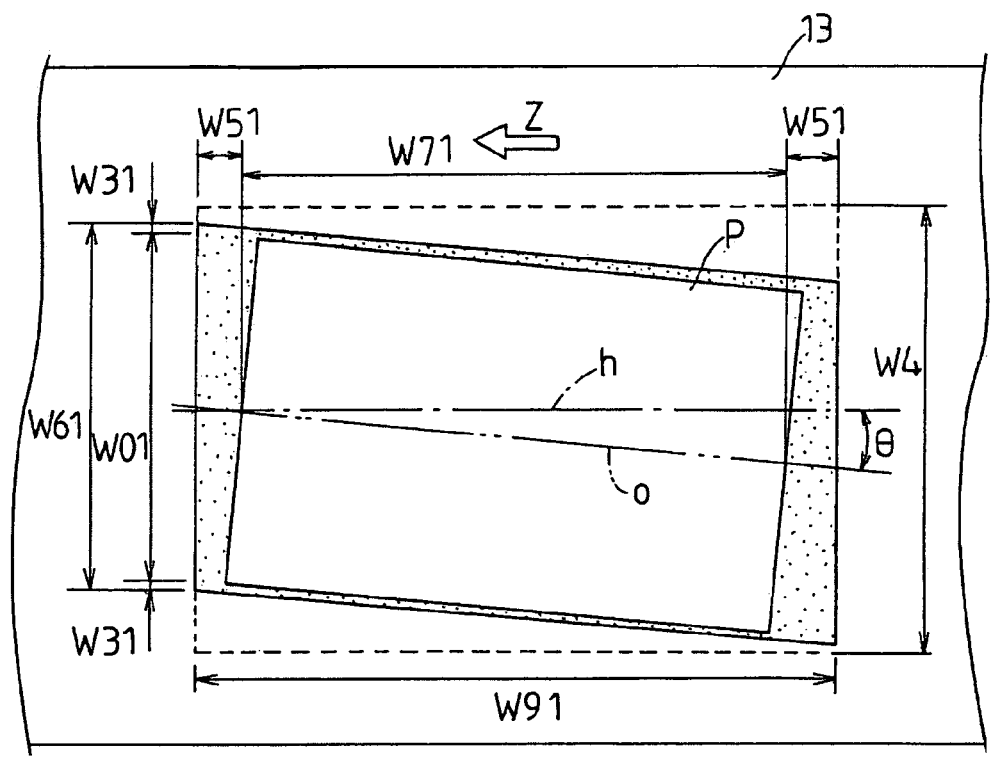
FIG. 16 is an explanatory diagram that illustrates the image forming region of the image on the second photosensitive drum that is changed before and after detection by the same line sensor.

The writing of the electrostatic latent image (image) to the second photosensitive drum 3b by the second exposing means 8b at the second image forming station S2 on the downstream side in the recording paper transport direction relative to the first image forming station S1 is performed after detecting the edge position of the recording paper P at the second detection point R2 with the line sensor 51, that is, after detection of the skew state of the recording paper P. As shown in FIG. 16, the image forming region width W61 in the lateral direction and the image forming region length W91 in the vertical direction of this photosensitive drum 3b are changed in advance and set before writing the electrostatic latent image with the second exposing means 8b based on the results of detecting the edge position and skew state of the recording paper P at the first and second detection points R1 and R2 with the line sensor 51. That is, the image forming region length W91 in the vertical direction on the second photosensitive drum 3b is determined by adding a margin value W51 to both the top and bottom (both the top and bottom of the center line "o") of the default value W71 for the length in the vertical direction parallel to the transport direction of the recording paper P obtained from the results of detecting the edge position and skew state of the recording paper P at the first and second detection points R1 and R2 of the recording paper P with the line sensor 51. On the other hand, the image forming region width W61 in the lateral direction on the second photosensitive drum 3b is determined by adding a margin value W31 to both the left and right sides of the actual width W01 of the toner image (electrostatic latent image) on the second photosensitive drum 3b of the second image forming station S2.

Figure 17:
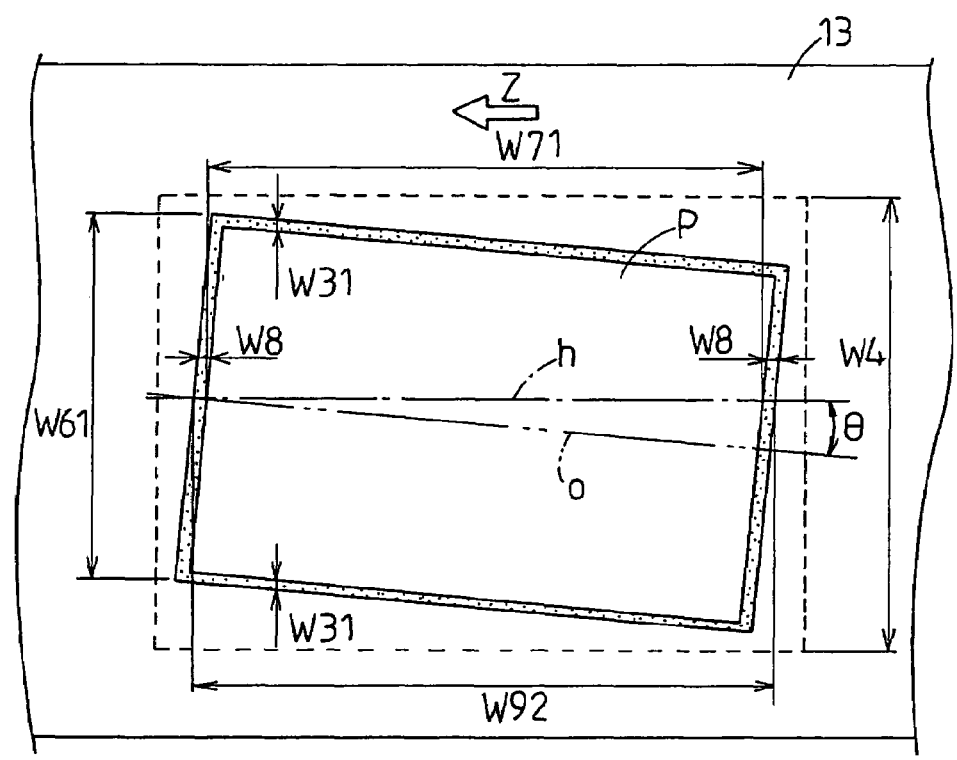
FIG. 17 is an explanatory diagram that illustrates the image forming region of the image on the third and fourth photosensitive drums that is changed before and after detection by the same line sensor.

The writing of the electrostatic latent image (image) to the photosensitive drums 3c and 3d by the exposing means 8c and 8d at the third and fourth image forming stations S3 and S4 on the downstream side in the recording paper transport direction relative to the second image forming station S2 is also performed after detecting the edge position of the recording paper P at the second detection point R2 with the line sensor 51, that is, after detection of the skew state of the recording paper P. As shown in FIG. 17, an image forming region width W61 in the lateral direction and an image forming region length W92 in the vertical direction on these third and fourth photosensitive drums 3c and 3d are changed in advance before writing by the exposing means 8c and 8d and set based on the results of detecting the edge position and skew state of the recording paper P at the first and second detection points R1 and R2 with the line sensor 51. That is, the image forming region length W92 in the vertical direction on the third and fourth photosensitive drums 3c and 3d is determined by adding a margin value W8 (for example, about 1 mm) to both the top and bottom (both the top and bottom of the center line "o") of the default value W71 for the length in the vertical direction parallel to the transport direction of the recording paper P obtained from the results of detecting the edge position and skew state of the recording paper P at the first and second detection points R1 and R2 of the recording paper P with the line sensor 51. On the other hand, the image forming region width W61 in the lateral direction on the third and fourth photosensitive drums 3c and 3d is the same as the width of a toner image (electrostatic latent image) on the second photosensitive drum 3b of the second image forming station S2 wherein a margin value W31 has been added to both the left and right sides of the actual width W01.

<Flowchart of Procedure for Changing the Image Forming Region of the Electrostatic Latent Image>

Figure 18:
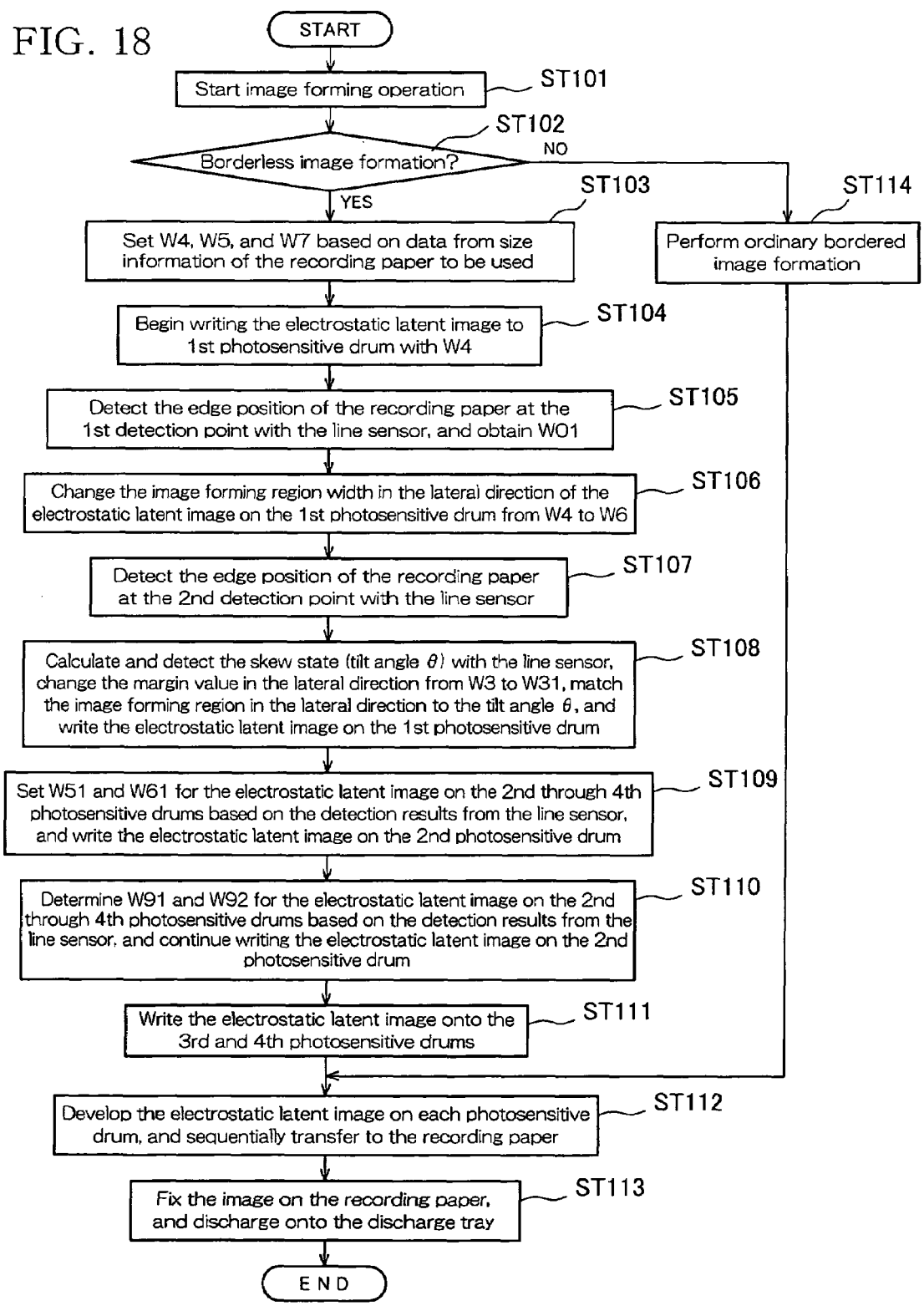
FIG. 18 is a flowchart that shows the procedure for changing the image forming region of the electrostatic latent image based on the detection results of the same line sensor.

Following is an explanation of the procedure for changing the image forming region of the electrostatic latent image based on the results of detecting the edge position and skew state of the recording paper P with the line sensor 51, with reference to the flowchart shown in FIG. 18.

First, in Step ST101 of the flowchart in FIG. 18, after pushing the start button of the operating portion 405 and beginning the image forming operation, in Step ST2 it is judged whether not a switch to the borderless image forming mode has been made by the selector switch. When this judgment of Step ST2 is NO, meaning that no switch has been made to borderless image forming mode, the procedure proceeds to Step ST114, and after performing ordinary bordered image formation, proceeds to Step ST112, described below.

The processing in steps ST103 and ST104 is the same as the processing in steps ST3 and ST4, respectively, shown in FIG. 9.

Afterwards, in Step ST105, an edge position (either a left or right edge position) in a lateral direction parallel to the transport direction of the recording paper P is detected by the line sensor 51 at the first detection point R1, and the actual width W01 in the lateral direction perpendicular to the transport direction of the recording paper P is obtained from the results of that detection. Then, in Step ST106, the image forming region width W6 in the lateral direction of the image (electrostatic latent image and toner image) on the first photosensitive drum 3a, which has been given the margin value W3 for both the left and right sides of the actual width W01 obtained in Step ST105, is computed by the calculating portion 407, and the image forming region width W4 in the lateral direction of the electrostatic latent image (toner image developed by the first developing apparatus 5a) written onto the first photosensitive drum 3a by the first exposing means 8a before detection of the edge position of the recording paper P by the line sensor 51 is changed to the image forming region width W6 in the lateral direction of the electrostatic latent image based on the results of detecting the edge position of the recording paper P at the first detection point R1 with the line sensor 51 while forming an image on the first photosensitive drum 3a.

Afterwards, in Step ST107, an edge position (either a left or right edge position) in a lateral direction parallel to the transport direction of the recording paper P is detected by the line sensor 51 at the second detection point R2. Then, in Step ST108, from the results of the detection performed in Step ST107, the tilt angle θ of the recording paper P is calculated and a skew state of the recording paper P is detected, based on the detection interval (time difference) of the first and second detection points R1 and R2 with the line sensor 51, the results of detection at those detection points R1 and R2 (results of reading the edge position), and the transport speed of the recording paper P. Then, the margin value W3 in the lateral direction of the electrostatic latent image is changed to a smaller margin value W31, the image forming region in the lateral direction is controlled such that it matches the tilt angle θ of the recording paper P and is shifted in the lateral direction (the main scanning direction), and an electrostatic latent image continues to be written on the first photosensitive drum 3a by the first exposing means 8a.

Then, in Step ST109, the image forming region width W61 (see FIG. 16) for the width in the lateral direction and the margin value W51 (see FIG. 15) in the vertical direction of the electrostatic latent image (toner image) written on the photosensitive drums 3b through 3d of the second to fourth image forming stations S2 through S4 on the downstream side of the recording paper transport direction relative to the first image forming station S1 by the exposing means 8b through 8d is set based on the results of detecting the edge position and skew state of the recording paper P with the line sensor 51, and writing of an electrostatic latent image on the second photosensitive drum 3b by the second exposing means 8b begins. Afterwards, in Step ST110, the default value W71 for the length in the vertical direction of the electrostatic latent image (toner image) on the photosensitive drums 3b through 3d of the second to fourth image forming stations S2 through S4 is calculated from the results of detecting the edge position and skew state of the recording paper P with the line sensor 51. The image forming region length W91 (W71+W51×2) in the vertical direction, wherein the margin value W51 has been added to both the top and bottom of this default value W71 for the length in the vertical direction, is determined, and writing of the electrostatic latent image on the second photosensitive drum 3b of the second image forming station S2 continues to be performed. Further, by adding a margin value W8 (see FIG. 17: for example, about 1 mm) to both the top and bottom of the default value W71 for the length in the vertical direction of the electrostatic latent image (toner image) on the photosensitive drums 3c and 3d of the third and fourth image forming stations S3 and S4, an image forming region length W92 (W71+W8×2) in the vertical direction of the electrostatic latent image written onto the photosensitive drums 3c and 3d of the third and fourth image forming stations S3 and S4 is determined. Afterward, in Step ST111, writing of an electrostatic latent image onto the photosensitive drums 3c and 3d of the third and fourth image forming stations S3 and S4 by the exposing means 8c and 8d is begun.

The processing in Steps 112 and 113 is the same as the processing in steps ST10 and ST11, respectively, shown in FIG. 9.

<Timing Chart for Writing the Electrostatic Latent Image>

Next, the timing for writing the electrostatic latent image onto the photosensitive drums 3a through 3d of the image forming stations S1 through S4, the cut-off timing for the registration roller clutch that cuts off driving force to the registration rollers 10, the timing for detecting the edge position of the recording paper P with the line sensor 51, and the timing for detection with the registration sensor 10a are explained with reference to the timing chart in FIG. 19.

Figure 19:
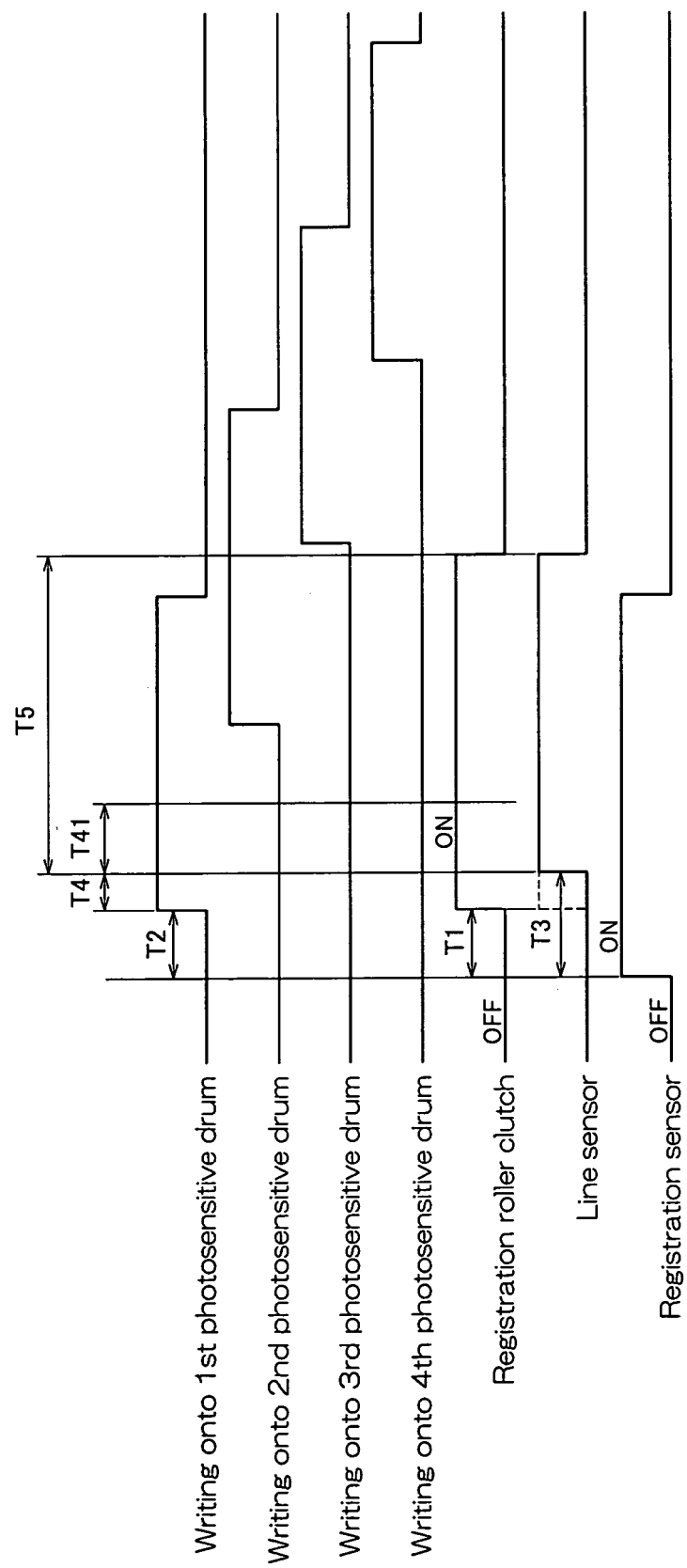
FIG. 19 is a timing chart that shows the timing for writing the electrostatic latent image onto the photosensitive drums, the cut-off timing for the registration roller clutch, the detection timing of the line sensor, and the detection timing of the registration sensor.

In the timing chart of FIG. 19, the writing of the electrostatic latent image onto the first photosensitive drum 3a of the first image forming station S1 is begun at about the same time as connection of the registration roller clutch (ON), which occurs at T2 seconds after the point in time that detection with the registration sensor 10a begins (ON). T4 seconds after the start of writing the electrostatic latent image onto the first photosensitive drum 3a of the first image forming station S1, that is, after detecting the edge position (either the left or right edge position) of the recording paper P at the first detection point R1 with the line sensor 51 (T3 seconds after detection with the registration sensor 10a begins), the image forming region width W4 in the lateral direction of the electrostatic latent image written onto the first photosensitive drum 3a by the first exposing means 8a before detection of the edge position of the recording paper P by the line sensor 51 is changed to the image forming region width W6 in the lateral direction of the electrostatic latent image based on the results of detecting the edge position of the recording paper P with the line sensor 51 during image formation on the first photosensitive drum 3a.

T41 seconds after detecting the edge position of the recording paper P at the first detection point R1 with the line sensor 51, the edge position of the recording paper P at the second detection point R2 (position of either the left or right side) is detected. The tilt angle θ of the recording paper P is calculated from the results of this detection, based on the detection interval (time difference) of the first and second detection points R1 and R2 with the line sensor 51, the detection results of the detection points R1 and R2 (the results of reading the edge position), and the transport speed of the recording paper P, such that the skew state of the recording paper P is detected. Writing of an electrostatic latent image (image) to the photosensitive drums 3b through 3d at the second to fourth image forming stations S2 through S4 by the exposing means 8b through 8d is performed in sequence at predetermined time intervals, after progressing T4 seconds from the beginning of writing an electrostatic latent image onto the first photosensitive drum 3a of the first image forming station S1, then detecting the edge position of the recording paper P with the line sensor 51, then progressing a further T41 seconds, then detecting the edge position of the recording paper P at the second detection point R2 with the line sensor 51 (after detection of the skew state of the recording paper P). That is, the image forming region width W61 in the lateral direction and the image forming region lengths W91 and W92 in the vertical direction on the photosensitive drums 3b through 3d of the second to fourth image forming stations S2 through S4 are changed in advance and set before writing of the electrostatic latent image by the exposing means 8b through 8d, based on the results of detecting the edge position of the recording paper P with the line sensor 51.

The meaning of the broken and solid lines that indicate the reading timing of the line sensor 51 are the same as in the first embodiment, explained with reference to FIG. 10.

Color registration correction control is also performed in the image forming apparatus X of this second embodiment. That is, data for a standard photosensitive drum (for example, the first photosensitive drum 3a that is furthest upstream) that corrects the image forming position (timing) of the other photosensitive drums 3b through 3d is stored in advance in the data storage portion 406 of the image forming apparatus X. The position and image forming region of the image formed on each of the photosensitive drums 3b through 3d is corrected based on that data and on the results of detecting the edge position and skew state of the recording paper P at the first and second detection points R1 and R2 with the line sensor 51, and image formation is controlled such that the image formed on the photosensitive drums 3a through 3d is correctly layered without the image shifting and color shift does not occur.

Accordingly, in the above second embodiment, when switching to borderless image forming mode with the selector switch of the operating portion 405, writing of an electrostatic latent image larger than the size of the recording paper P onto the first photosensitive drum 3a of the first image forming station S1 begins. When the edge position of the recording paper P is detected at the first detection point R1 by the line sensor 51, the size of the electrostatic latent image on the first photosensitive drum 3a subsequently to be transferred to the midstream of the recording paper P is changed based on the results of detection by the line sensor 51 (the results of detecting the edge position of the recording paper P at the first detection point R1). Further, when the edge position of the recording paper P is detected at the second detection point R2 by the line sensor 51, the skew state of the recording paper P is detected by calculating the tilt angle θ of the recording paper P based on the results of that detection, and while changing the image forming region in the lateral direction of the electrostatic latent image, it is controlled such that it matches the tilt angle θ of the recording paper P and shifts in the lateral direction (the main scanning direction). Subsequent image formation on the recording paper P is performed according to the electrostatic latent image (toner image) on the first photosensitive drum 3a whose size has been changed in this manner. Specifically, as shown in FIG. 5 and FIG. 14, when the recording paper P of width W0 is transported and the leading edge is corrected by the registration rollers 10, the effective width W1 of the recording paper P is obtained in anticipation of the corrected shift of the recording paper P due to that correction. The image forming region width W4 (W1+ W2×2) in the lateral direction of the recording paper, to which the margin values W2, W2 of about 1 mm have been added to both sides of this effective width W1, is determined, and writing of an electrostatic latent image with this image forming region width W4 in the lateral direction onto the first photosensitive drum 3a of the first image forming station S1 by the first exposing means 8a begins. As shown in FIG. 14, when the actual width W0 of the recording paper P is obtained from the results of detecting the edge position of the recording paper P with the line sensor 51, the image forming region width W6 in the lateral direction of the image (electrostatic latent image and toner image) on the first photosensitive drum 3a, to which the margin value W3 has been given to both the left and right sides of that obtained actual width W0, is computed by the calculating portion 407. The image forming region width W4 in the lateral direction of the electrostatic latent image (the toner image developed by the first developing apparatus 5a) written onto the first photosensitive drum 3a by the first exposing means 8a before detection of the edge position of the recording paper P at the first detection point R1 by the line sensor 51 is changed to the image forming region width W6 in the lateral direction of the electrostatic latent image based on the results of detecting the edge position of the recording paper P at the first detection point R1 with the line sensor 51 during image formation on the first photosensitive drum 3a. Further, when the edge position of the recording paper at the second detection point R2 is detected by the line sensor 51, the skew state of the recording paper P is detected by calculating the tilt angle θ of the recording paper P based on the detection interval (time difference) of the first and second detection points R1 and R2 with the line sensor 5i, the detection results of the detection points R1 and R2 (the results of reading the edge position), and the transport speed of the recording paper P. While changing the margin value W3 in the lateral direction of the electrostatic latent image to a smaller margin value W31, the image forming region in the lateral direction is matched to the tilt angle θ of the recording paper P and controlled such that it shifts in the lateral direction (main scanning direction), and an electrostatic latent image continues to be written onto the first photosensitive drum 3a by the first exposing means 8a. That is, the image forming region width in the lateral direction of the electrostatic latent image written onto the first photosensitive drum 3a by the first exposing means 8a (the toner image developed by the first developing apparatus 5a) is changed such that it decreases before and after detection of the edge position and skew state of the recording paper P with the line sensor 51. Thus, before detection of the edge position and skew state of the recording paper P with the line sensor 51, even if detection of the edge position and skew state of the recording paper P is not performed, with the toner image (electrostatic latent image) on the first photosensitive drum 3a that is larger than the size of the recording paper P it is possible to transfer a good image onto the recording paper P without causing image loss due to skew of the recording paper P. On the other hand, after detection of the edge position and skew state of the recording paper P with the line sensor 51, even if determination of the size of the image on the first photosensitive drum 3a is not performed in time, the size of the toner image on the first photosensitive drum 3a is changed to a size conforming to the edge position of the recording paper P based on the results of detecting the edge position and skew state of the recording paper P. Thus, the amount of toner recovered by the cleaning apparatus 7a after not being transferred to the recording paper P can be decreased as much as possible, and in addition to economically consuming toner by suppressing toner waste, it is possible to extend the cycle until recovered toner is full. In the cleaning apparatus 7a as well, in which a container that contains the recovered toner is integrated, partial accumulation of the recovered toner in the container is suppressed and it is possible to prevent poor cleaning due to a portion of the recovered toner leaking out.

By writing the electrostatic latent image onto the first photosensitive drum 3a by the first exposing means 8a before detection of the edge position and skew state of the recording paper P with the line sensor 51, it is possible to provide the line sensor 51 closer to the transfer point G. The transport distance L1 from the detection point R1 (R2) of the edge position of the recording paper P detected with the line sensor 51 to the transfer point G is shortened in the transport direction of the recording paper P, and in addition to being able to achieve a more compact image forming apparatus X, it is possible to shorten the time necessary for image formation.

Because the line sensor 51 is provided immediately downstream of the registration rollers 10, tilted transport of the recording paper P transported towards the transfer point G is corrected to some extent by the registration rollers 10. Thus, by detecting the edge position of the recording paper P in an approximately corrected state with the line sensor 51, in addition to detecting the edge position of the recording paper P with high precision, the image made to have a margin on the first photosensitive drum 3a, formed before detection of the edge position and skew state of the recording paper P with the line sensor 51, becomes as small as possible. Thus this configuration is very advantageous for reducing the amount of wasted toner recovered after not being transferred to the recording paper P.

Furthermore, because the distance L1 from the detection point R1 (R2) detected by the line sensor 51 to the transfer point G is set shorter than the distance L0 from the writing point Q of the electrostatic latent image onto the first photosensitive drum 3a to the transfer point G, detection of the edge position and skew state of the recording paper P by the line sensor 51 can be performed at an early stage. By quickly changing the size of the electrostatic latent image on the first photosensitive drum 3a based on the detection results after detecting the edge position and skew state of the recording paper P with the line sensor 51, it is possible to effectively decrease the amount of wasted toner that is recovered after not being transferred to the recording paper P The size of the electrostatic latent image written onto the first photosensitive drum 3a by the first exposing means 8a during image formation subsequent to detection of the edge position and skew state of the recording paper P with the line sensor 51 is changed at the first photosensitive drum 3a of the first image forming station S1 positioned furthest upstream in the transport direction of the recording paper P. However, at photosensitive drums 3b through 3d of the second to fourth image forming stations S2 through S4 that are further downstream in the transport direction, before writing the electrostatic latent image to each of the photosensitive bodies 3b through 3d by the exposing means 8b through 8d, an electrostatic latent image is written that has a size (a size with as little margin as possible) based on the results of detecting the edge position and skew state of the recording paper P with the line sensor 51. Thus, the amount of wasted toner that is recovered after not being transferred to the recording paper P is effectively reduced in the cleaning apparatuses 7b through 7d of the second to fourth image forming stations S2 through S4, and it is possible to dramatically lengthen the cycle until the container in the cleaning apparatuses 7b through 7d is full.

Data for a standard photosensitive drum (for example, the first photosensitive drum 3a that is furthest upstream) that corrects the image forming position (timing) of the other photosensitive drums 3b through 3d is stored in advance in the data storage portion 406 of the image forming apparatus X. The position of the image formed on each of the photosensitive drums 3b through 3d is corrected based on that data and on the results of detecting the edge position and skew state of the recording paper P at the first and second detection points R1 and R2 with the line sensor 51, and controlled such that the image formed on the photosensitive drums 3a through 3d is correctly layered without the image shifting and color shift does not occur. Thus, even if positional shift of the photosensitive drums 3a through 3d, positional shift of the writing of the electrostatic latent image onto the photosensitive drums 3b through 3d by the exposing means 8b through 8d, transport tilt of the transfer/transport belt 13, or the like are present, an image with a range as small as possible relative to the recording paper P transported on the transfer/transport belt 13 can be formed after the results of detecting the edge position and skew state of the recording paper P are obtained from the line sensor 51, and it is possible to set a small amount of margin for the range in which the image is formed.

Third Embodiment

In the third embodiment of the present invention, the settings for the distance from the detection point of the line sensor to the transfer point and the distance from the writing point of the exposing means to the transfer point are changed. This is explained with reference to FIG. 20 and FIG. 21. Except for the settings for the distance from the detection point of the line sensor to the transfer point and the distance from the writing point of the exposing means to the transfer point, the configuration is the same as in the case of the second embodiment. Parts that are the same are given the same numerals, and a detailed explanation of those parts is omitted.

In this third embodiment, the distance from the detection point of the edge position of the recording paper P detected by the line sensor to the transfer point is set such that it is quite longer than the distance from the writing point of the electrostatic latent image (image) written to the first photosensitive drum 3a of the first image forming station S1 by the first exposing means 8a.

<Flowchart of Procedure for Changing the Image Forming Region of the Electrostatic Latent Image>

Figure 20:
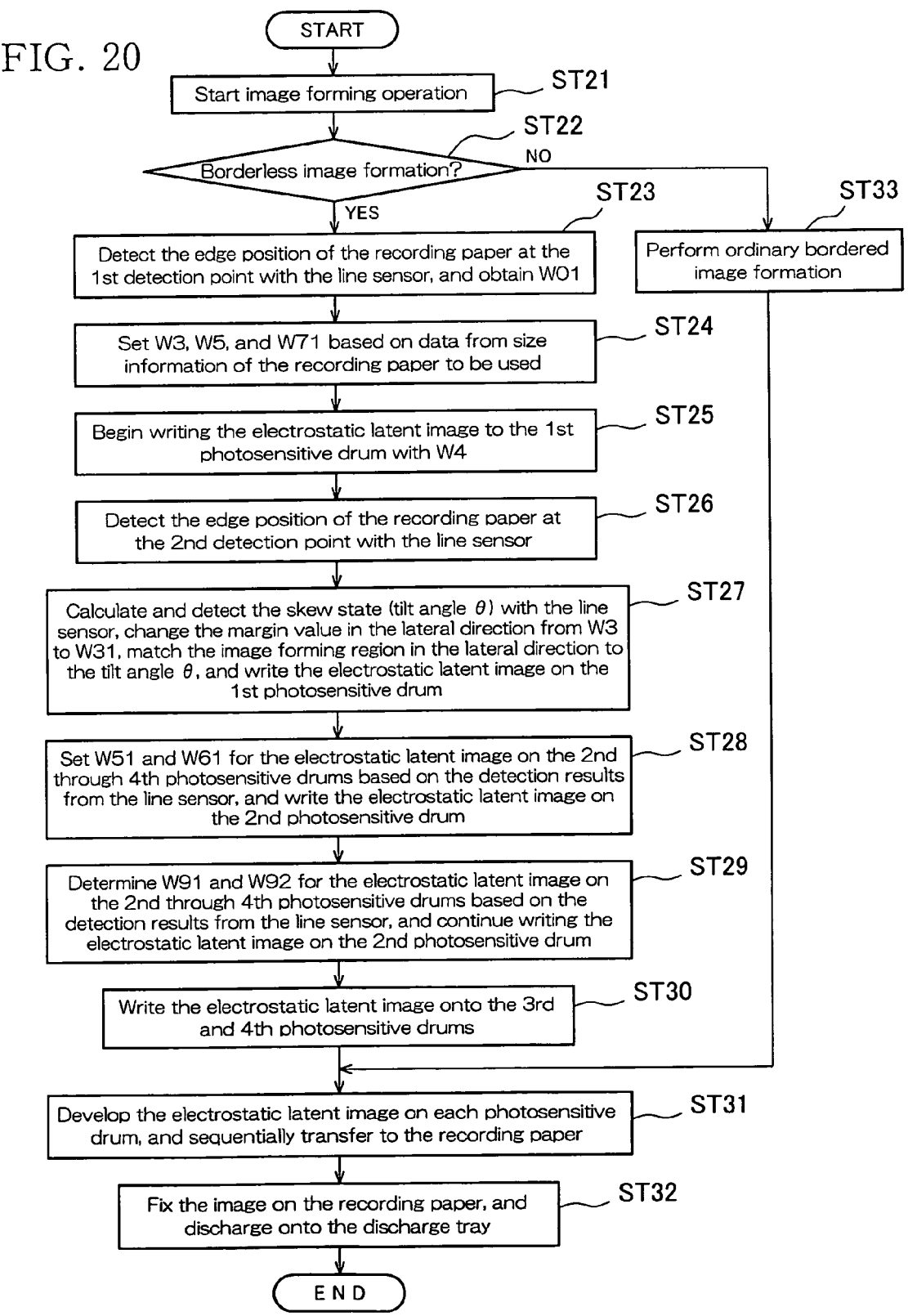
FIG. 20 is a flowchart that shows the procedure for changing the image forming region of the electrostatic latent image based on the detection results by the line sensor according to the image forming apparatus employing an electrophotographic system associated with a third embodiment of the present invention.

Following is an explanation of the procedure for changing the image forming region of the electrostatic latent image based on the results of detecting the edge position and skew state of the recording paper P with the line sensor 51, with reference to the flowchart shown in FIG. 20.

First, in Step ST21 of the flowchart in FIG. 20, after pushing the start button of the operating portion 405 and beginning the image forming operation, in Step ST22 it is judged whether not a switch to the borderless image forming mode has been made by the selector switch. When this judgment of Step ST22 is NO, meaning that no switch has been made to borderless image forming mode, the procedure proceeds to Step ST33, and after performing ordinary bordered image formation, proceeds to Step ST31, described below.

Figure 21:
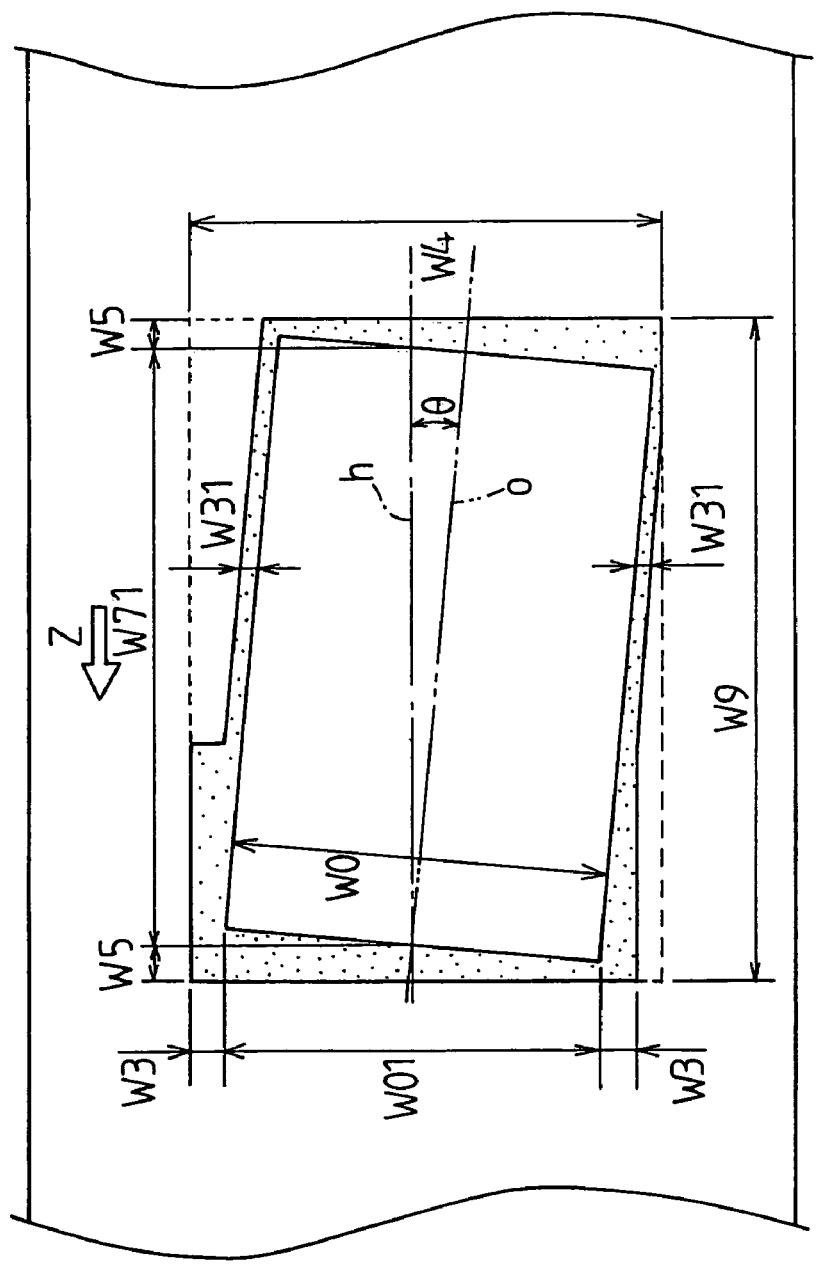
FIG. 21 is an explanatory diagram that illustrates the image forming region of the image on the first photosensitive drum that is changed before and after detection at the second detection point by the same line sensor.

When this judgment of Step ST 22 is YES, meaning that a switch has been made to borderless image forming mode, in Step ST23 the edge position (either the left or right edge position) in the lateral direction parallel to the transport direction of the recording paper P at the first detection point R1 is detected by the line sensor 51, and the actual width W01 (see FIG. 21) in the lateral direction perpendicular to the transport direction of the recording paper P is obtained from the results of that detection. Then, in Step ST24, from the information of the size of the recording paper P used, as shown in FIG. 21, the margin value W3 (the margin value given to both the left and right sides of the actual width W01 of the recording paper P) in the lateral direction of the electrostatic latent image on the first photosensitive drum 3a of the first image forming station S1, the margin value W5 in the vertical direction of the electrostatic latent image including start variation and margin of the recording paper P due to the registration rollers 10, and the default value W71 in the vertical direction of the recording paper transport direction of the electrostatic latent image are respectively set based on the data stored in the data storage portion 406.

Next, in Step S25, writing of an electrostatic latent image with the image forming region width W4 (W01+W3×2) in the lateral direction on the first photosensitive drum 3a of the first image forming station S1 by the first exposing means 8a begins.

The processing in steps ST26 through 30 is the same as the processing in steps ST107 through 111, respectively, shown in FIG. 18.

The processing in steps ST31 and 32 is the same as the processing in steps ST10 and ST11, respectively, shown in FIG. 9.

Accordingly, in the third embodiment, the distance from the detection point of the edge position of the recording paper P detected by the line sensor to the transfer point is set such that it is quite longer than the distance from the writing point of the electrostatic latent image (image) written to the first photosensitive drum 3a of the first image forming station S1 by the first exposing means 8a. Thus, when detecting the edge position of the recording paper P, after transporting the recording paper P and performing detection of the edge position of the recording paper P at the first detection point R1 by the line sensor 51, writing of the electrostatic latent image onto the first photosensitive drum 3a by the first exposing means 8a is begun. Thus it is possible to set the size of the electrostatic latent image written onto the first photosensitive drum 3a of the first image forming station S1 to a small size based on the results of detecting the edge position of the recording paper P at the first detection point R1 with the line sensor 51. Further, the edge position and skew state of the recording paper P are detected at the first detection point R1 with the line sensor 51 at an early stage, the subsequent size of the electrostatic latent image on the first photosensitive drum 3a is quickly changed in response to the skew state of the recording paper P, and it is possible to greatly reduce the amount of wasted toner that is recovered after not being transferred to the recording paper P.

Fourth Embodiment

Next, a fourth embodiment of the present invention will be explained with reference to FIG. 22.

In this embodiment, a monochrome digital copy machine is applied as an image forming apparatus.

Figure 22:
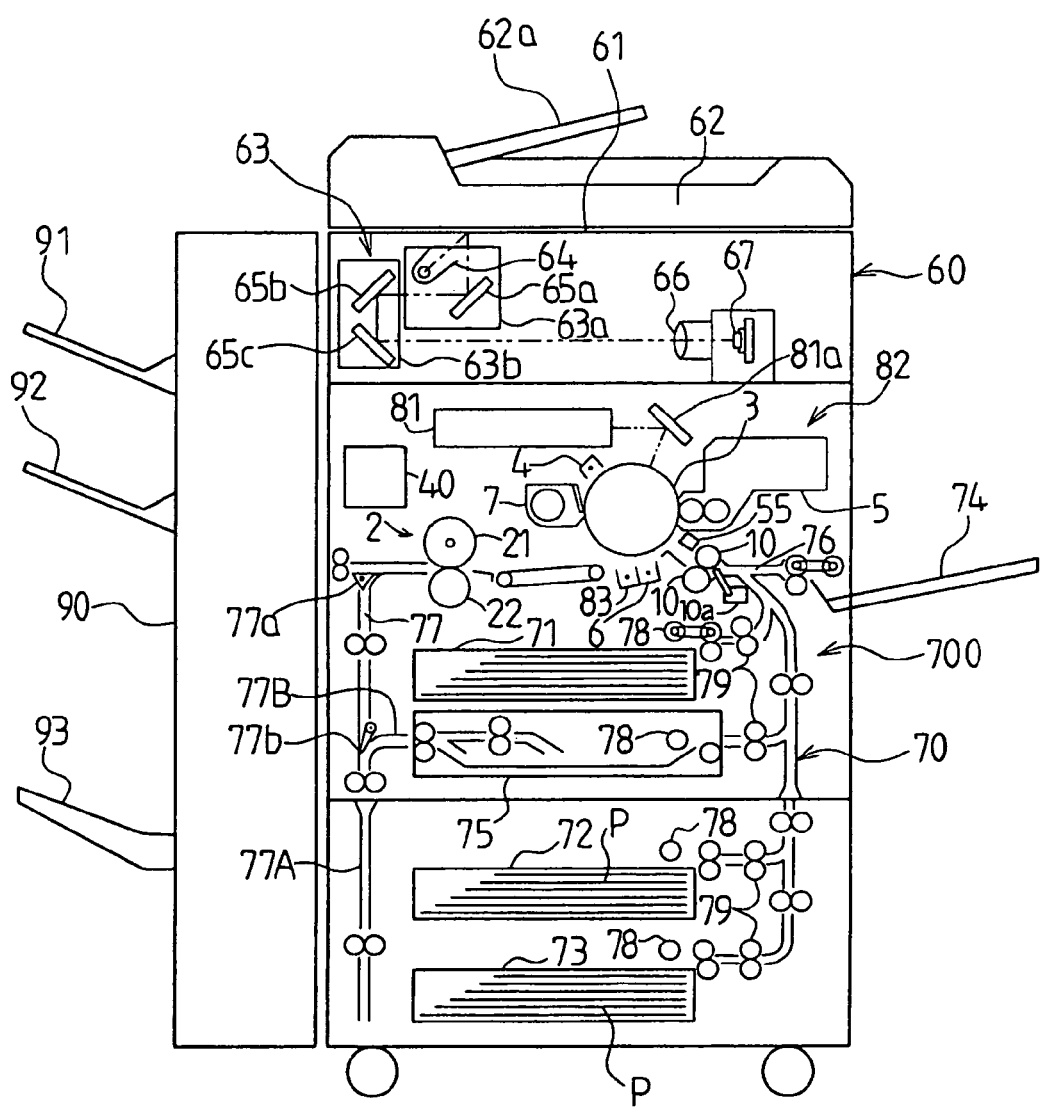
FIG. 22 is a schematic diagram that shows the overall configuration of the monochrome digital copy machine employing an electrophotographic system associated with a fourth embodiment of the present invention.

That is, as shown in FIG. 22, this digital copy machine X1 is provided with a scanner portion 60, an image forming system that performs image formation on the recording paper P, and a paper transport mechanism 700 that transports the recording paper P to this image forming system. Following is an explanation of each portion.

<Explanation of the Scanner Portion 60>

The scanner portion 60 is provided with an original stage 61 comprising transparent glass or the like, and a reversing automatic document feeder (RADF) 62 that supplies an original onto this original stage 61. The scanner portion 60 reads an image of the original on this original stage 61 and creates image data.

The RADF 62 is provided with an automatic supply tray 62a for automatically supplying an original with a set number of pages onto the original stage 61 page by page. This RADF 62 can let a scanner unit 63, described below, read one or both sides of an original according to a user's selection. Specifically, a transport path for transporting the original on the automatic supply tray 62a onto the original stage 61 and a reverse path that reverses the original for which both sides should be read by the scanner unit 63 are provided. Only the transport path is used when only one side of the original is to be read, and when both sides of the original are to be read, the original transported onto the original stage 61 via the transport path is reversed in the reverse path and re-transported onto the original stage 61. Thus, a transport path switching means and a sensor group for identifying the transport position of the original (both omitted from the figures) are provided in each path. The configuration of the RADF 62 is widely known from the conventional technology, and therefore a detailed explanation is omitted.

This scanner portion 60 includes a scanner unit 63 for reading an image of the original transported onto the original stage 61. This scanner unit 63 includes a lamp reflector assembly 64, multiple reflecting mirrors 65a, 65b, and 65c, an optical lens 66, and a photoelectric transducer (CCD) 67.

The lamp reflector assembly 64 is for irradiating light to the original placed on the original stage 61. As shown by the optical path indicated by the double-dashed line in FIG. 22, the reflecting mirrors 65a, 65b, and 65c once reflect the light reflected from the original in the left direction of the FIG., then reflect in the downward direction, then reflect in the right direction towards the optical lens 66.

As an original image reading operation, when the original is placed on the original stage 61, a first scanning unit 63a comprising the lamp reflector assembly 64 and the reflecting mirror 65a scans along the original stage 61 in the horizontal direction, irradiating light to the entire original. At this time, a second scanning unit 63b comprising the reflecting mirrors 65b and 65c moves in the same direction at a predetermined ratio of speed relative to the first scanning unit 63a (half the speed of the first scanning unit 63a).

Light that has been reflected by the reflecting mirrors 65a, 65b, and 65c and has passed the optical lens 66 forms an image on the photoelectric transducer 67, and in this photoelectric transducer 67 reflected light is converted to an electric signal (original image data).

The image data obtained in this manner is transmitted to an image processing portion (not shown), described below, and after various processing is performed here, stored in an image memory (not shown), and according to an output instruction the image data in the image memory is read and used for the image forming operation performed by the image forming system.

<Explanation of the Image Forming System>

The image forming system includes a laser writing unit 81 and an electrophotographic process portion 82. The laser writing unit 81 irradiates laser light based on original image data converted in the photoelectric transducer 67, image data transmitted from a personal computer, or the like to the surface of the photosensitive drum 3, which is an image carrier of the electrophotographic process portion 82. Specifically, this laser writing unit 81 includes a semiconductor laser light source that irradiates laser light according to the image data, a polygon mirror that deflects this laser light at a constant angular speed, and an f-θ lens that corrects such that this equiangular speed deflected laser light scans on the photosensitive drum 3 at a uniform speed, and the like.

The photosensitive drum 3 rotates in the direction shown by the arrow in FIG. 22, laser light from the laser writing unit 81 is reflected by the reflecting mirror 81a and irradiated, and thus an electrostatic latent image is formed on the surface of the photosensitive drum 3.

The electrophotographic process portion 82 includes a charger 4, a developing apparatus 5, a transfer unit 6, de-electrifier 83, a stripper, a cleaning apparatus 7, and a fixing apparatus 2, disposed around the photosensitive drum 3. The charger 4 charges the surface of the photosensitive drum 3 to a predetermined potential before an electrostatic latent image is formed. The developing apparatus 5 develops the electrostatic latent image formed on the surface of the photosensitive drum 3 into a visible image with toner. The transfer unit 6 transfers a toner image formed on the surface of the photosensitive drum 3 to the recording paper P. The fixing apparatus 2 fixes the toner image transferred to the recording paper P onto the recording paper P with heat, and is provided with a hot roller 21 and a pressure roller 22. The de-electrifier 83 removes a residual charge from the surface of the photosensitive drum 3. The stripper and the cleaning apparatus 7 remove toner that remains on the surface of the photosensitive drum 3 after toner transfer. In this case, the cleaning apparatus 7 is formed integrated with the container.

Thus, when forming an image on the recording paper P, the surface of the photosensitive drum 3 is charged to a predetermined potential by the charger 4, the laser writing unit 81 irradiates laser light based on the image data to the surface of the photosensitive drum 3 and an electrostatic latent image is formed. Afterwards, the developing apparatus 5 develops a visible image on the surface of the photosensitive drum 3 with toner, and the toner image is transferred by the transfer unit 6 to the recording paper P supplied from the paper transport mechanism 700. Afterwards, this recording paper P is heated by the fixing apparatus 2 and the toner image is fixed. On the other hand, the remaining charge on the surface of the photosensitive drum 3 is removed by the de-electrifier 83, and toner remaining on the surface of the photosensitive drum 3 is removed by the stripper and the cleaning apparatus 7. Thus, one cycle of the image forming operation (print operation) to the recording paper P is completed. By repeating this cycle, it is possible to consecutively perform image formation on multiple sheets of the recording paper P.

<Explanation of the Paper Transport Mechanism 700>

The paper transport mechanism 700 transports recording papers P contained in first, second, and third paper cassettes 71, 72, and 73, and multi-manual tray 74 page by page, allowing the image forming system to perform image formation, and discharges the recording paper P on which an image has been formed to a first, second, or third discharge tray 91, 92, or 93. Also, this paper transport mechanism 700 includes a duplex copy unit 75 for allowing image formation to be performed by the image forming system on the other side of the recording paper P which has had an image formed on one side, after the recording paper P is reclaimed.

Different size recording papers P are contained in the paper cassettes 71, 72, and 73, respectively, and recording paper P is sequentially taken page by page from the paper cassette in which the user's desired size of recording paper P is contained and sequentially transported to the image forming system via the transport path 70.

As the transport path 70 of this paper transport mechanism 700, there are a main transport path 76 and a reverse transport path 77.

In the main transport path 76, one end (the upstream end in the recording paper transport direction) is branched and faces the discharge side of the paper cassettes 71, 72, and 73, and the multi-manual tray 74, respectively, and the other end (the upstream end in the recording paper transport direction) faces a post-processing apparatus 90 provided with the discharge trays 91, 92, and 93 via the transfer unit 6 and the fixing apparatus 2.

The reverse transport path 77 is joined at one end (the upper end in the figure), on the downstream side (the left side in the figure) of the fixing apparatus 2, to the main transport path 76, and the midstream portion (the central portion in the vertical direction in the figure) branches to a first and second branch path 77A and 77B. The first branch path 77A is extended vertically downward. On the other hand, one end of the second branch path 77B faces the intake side of the duplex copy unit 75.

First and second branch catches 77a and 77b are respectively provided in the connecting portion of the main transport path 76 and the reverse transport path 77, and the branch portion of the reverse transport path 77.

The first branch catch 77a is rotatable around a horizontal axis between a first position that blocks the reverse transport path 77, and a second position that obstructs the discharge side of the main transport path 76 and links the main transport path 76 with the reverse transport path 77. When this first branch catch 77a is in the first position, the recording paper P that has passed through the image forming system is discharged directly to the discharge trays 91, 92, and 93. On the other hand, when the first branch catch 77a is in the second position, the recording paper P that has passed through the image forming system is supplied to the reverse transport path 77.

The second branch catch 77b is rotatable around a horizontal axis between a first position that opens the first branch path 77A of the reverse transport path 77 and blocks the second branch path 77B, and a second position that opens the second branch path 77B and blocks the first branch path 77A. When this second branch catch 77b is in the first position, the recording paper P transported to the reverse transport path 77 is guided to the first branch path 77A and transported to its lower edge position. Afterwards, when the second branch catch 77b moves to the second position and the transport direction of the recording paper P is reversed, this recording paper P is transported to the second branch path 77B via the branch portion and supplied to the duplex copy unit 75. That is, the recording paper P is supplied to the duplex copy unit 75 via the first branch path 77A and the second branch path 77B, and thus when this recording paper P is supplied to the image forming system, the top and bottom are reversed, and image forming can be performed on the back side of the recording paper P.

A pickup roller 78 is arranged at the upstream end of the main transport path 76 (the portion facing the discharge side of the paper cassettes 71, 72, and 73, the multi-manual tray 74, and the duplex copy unit 75). Multiple paper supply rollers 79 for supplying the withdrawn recording paper P to the main transport path 76 are arranged downstream of the pickup rollers 78. By the rotation of this pickup roller 78 and the paper supply rollers 79, the recording paper P contained in the paper cassettes 71, 72, and 73, the multi-manual tray 74, and the duplex copy unit 75 can be selectively supplied to the main transport path 76 page by page.

As the discharge portion of the digital copy machine X1 described above, up/down two-level first and second discharge trays 91 and 92, and one third discharge tray 93 including a staple finisher (not shown) included in the post-processing apparatus 90 are provided. That is, inside the post-processing apparatus 90, a transport path is provided that joins the downstream end of the main transport path 76 to the discharge trays 91, 92, and 93, and the transport path can be switched according to the discharge trays 91, 92, and 93 to which the recording paper P is discharged.

Registration rollers 10 are provided upstream in the transport direction of the recording paper P relative to the photosensitive drum 3 that hold the recording paper P sequentially transported to the image forming system via the transport path 70. Upstream in the transport direction of the recording paper relative to the transfer point where the toner image (image) formed on the photosensitive drum 3 is transferred to the recording paper P, a line sensor 55 is provided that detects the edge position of the recording paper P transported toward the transfer point. This line sensor 55 is provided above one side in the direction perpendicular to the transport direction of the recording paper P. The line sensor 55 is provided with a lighting means (not shown) that irradiates irradiating light toward the transport path 70 (downward) and a light receiving means as an integrated body, irradiating light that is irradiated from this lighting means is reflected by the transported recording paper P, and the edge position of the recording paper P is detected according to whether or not light is received by the light receiving means. Also, the line sensor 55 is provided immediately downstream of the registration rollers 10 in the transport direction of the recording paper, and before detection of the edge position of the recording paper P by the line sensor 55, transport tilt of the recording paper P is corrected to a certain extent by the registration rollers 10, and the position of the toner image (image) on the photosensitive drum 3 relative to the recording paper P is adjusted. In this case, the distance from the detection point of the recording paper P detected by the line sensor 55 to the transfer point is set so that it is shorter than the distance from the writing point of the electrostatic latent image (image) on the photosensitive drum 3b by the laser writing unit 81 to the transfer point. Reference numeral 40 in FIG. 22 indicates a control portion.

Accordingly, in the embodiment described above, an image on the photosensitive drum 3 larger than the size of the recording paper P is transferred to the recording paper P transported toward the transfer point. When the edge position of the recording paper P is detected by the line sensor 55, the subsequent size of the image on the photosensitive drum 3 to be transferred to the midstream of the recording paper P is changed based on the detection results by the line sensor 55. That is, before and after detection obtaining the edge position of the recording paper P is performed by the line sensor 55, the size of the image formed on the photosensitive drum 3 is changed. Thus, before detection by the line sensor 55, even if the edge position of the recording paper P is not detected, with the image on the photosensitive drum 3 that is larger than the size of the recording paper P it is possible to transfer a good image onto the recording paper P without causing image loss due to transport shift of the recording paper P. Even if determination of the size of the image on the photosensitive drum 3a is not performed in time, after detection by the line sensor 55, the size of the image on the photosensitive drum 3 is changed to a size conforming to the edge position of the recording paper P based on the results of detecting the edge position of the recording paper P. Thus, the amount of toner recovered by the cleaning apparatus 7 after not being transferred to the recording paper P can be decreased as much as possible, and in addition to being able to economically consume toner by suppressing toner waste, it is also possible to extend the cycle until recovered toner is full. In the cleaning apparatus 7 as well, in which a container that contains the recovered toner is integrated, partial accumulation of the recovered toner in the container is suppressed and it is possible to prevent poor cleaning due to a portion of the recovered toner leaking out.

By forming an image on the photosensitive drum 3 before detection of the edge position of the recording paper P by the line sensor 55, it is possible to provide the line sensor 55 closer to the transfer point. Thus the transport path of the recording paper P from the detection point where the edge position of the recording paper P is detected by the line sensor 55 to the transfer point is shortened in the transport direction, and in addition to being able to achieve a more compact digital copy machine X1, it is also possible to shorten the time necessary for image formation.

Further, in the line sensor 55, because the lighting means and the light receiving means are provided as an integrated body, it is possible to integrate the line sensor 55 and the lighting means, and in addition to easily performing assembly, it is possible to use a publicly-sold line image sensor head for use in small scanners.

Fifth Embodiment

In the fourth embodiment above, the line sensor 55 only detects the edge position of the recording paper P. A configuration wherein this is changed such that the edge position of the recording paper P is detected at two locations in the recording paper transport direction, making it possible to also detect the skew state of the recording paper P, is described below as a fifth embodiment. Parts of the configuration that are the same as in the fourth embodiment are given the same reference numerals, and primarily the differing points are explained.

In this fifth embodiment, before detection of the edge position and skew state of the recording paper P by the line sensor 55, an image on the photosensitive drum 3 larger than the size of the recording paper P is transferred to the recording paper P transported toward the transfer point. When the edge position and skew state of the recording paper P are detected by the line sensor 55, the size of the image on the photosensitive drum 3 subsequently to be transferred to the midstream of the recording paper P is changed, based on the results of detecting the edge position and skew state of the recording paper P by the line sensor 55. That is, the size of the image formed on the photosensitive drum 3 changes greatly before and after the results of detecting the edge position and skew state of the recording paper P with the line sensor 55 are obtained. Thus, before detection of the edge position and skew state of the recording paper P by the line sensor 55, even if the edge position and skew state of the recording paper P is not detected, with the image on the photosensitive drum 3 that is larger than the size of the recording paper P it is possible to transfer a good image onto the recording paper P without causing image loss due to transport shift of the recording paper P. Even if determination of the size of the image on the photosensitive drum 3a is not performed in time, after detection of the edge position and skew state of the recording paper P by the line sensor 55, the size of the toner image on the photosensitive drum 3 is changed to a size conforming to the edge position and skew state (tilt angle θ) of the recording paper P based on the results of detecting the edge position and skew state of the recording paper P. Thus, the amount of toner recovered by the cleaning apparatus 7 after not being transferred to the recording paper P can be decreased as much as possible, and in addition to being able to economically consume toner by suppressing toner waste, it is also possible to extend the cycle until recovered toner is full. In the cleaning apparatus 7 as well, in which a container that contains the recovered toner is integrated, partial accumulation of the recovered toner in the container is suppressed and it is possible to prevent poor cleaning due to a portion of the recovered toner leaking out.

By forming an image on the photosensitive drum 3 before detection of the edge position and skew state of the recording paper P by the line sensor 55, it is possible to provide the line sensor 55 closer to the transfer point. Thus the transport path of the recording paper P from the detection point where the edge position of the recording paper P is detected by the line sensor 55 to the transfer point is shortened in the transport direction, and in addition to being able to achieve a more compact digital copy machine X1, it is also possible to shorten the time necessary for image formation.

Other Embodiments

Figure 23:
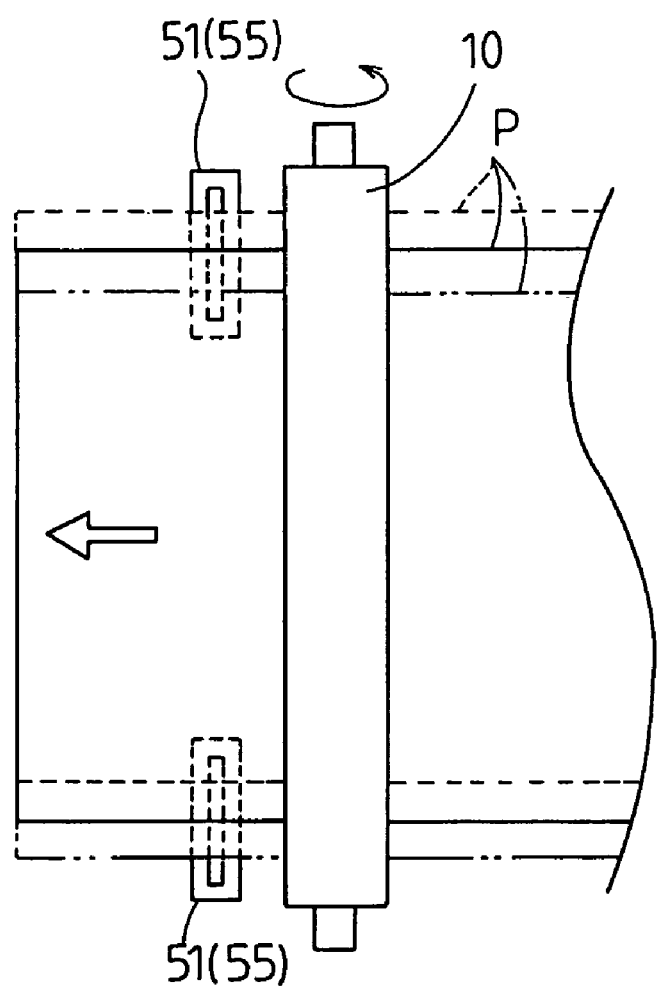
FIG. 23 is a plan view of the vicinity of the line sensor associated with another modified embodiment, viewed from above.
Figure 24:
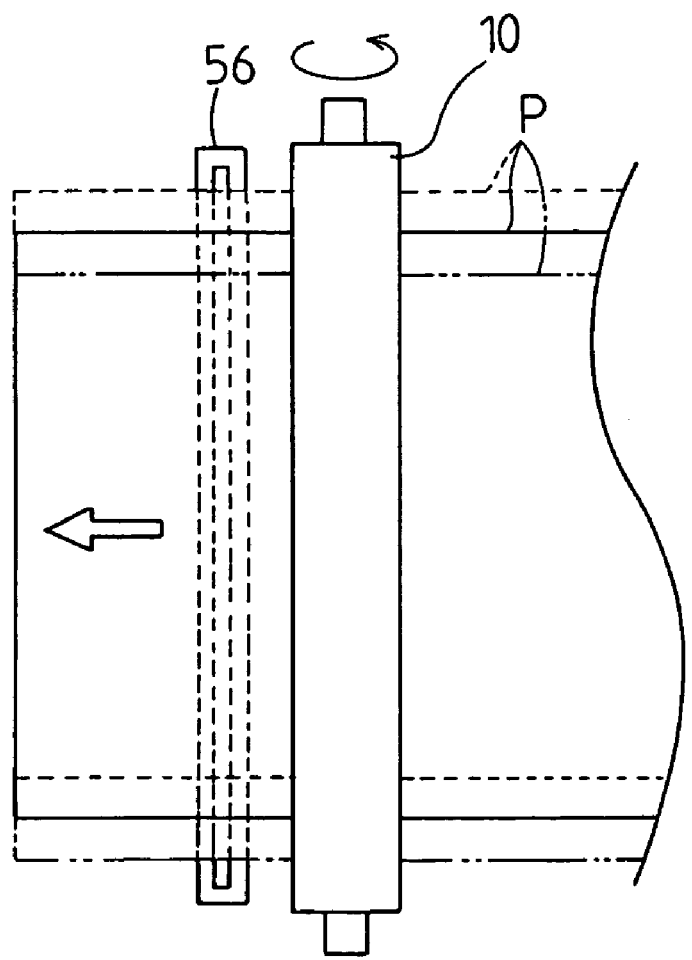
FIG. 24 is a plan view of the vicinity of the line sensor associated with another modified embodiment, viewed from above.
Figure 25:
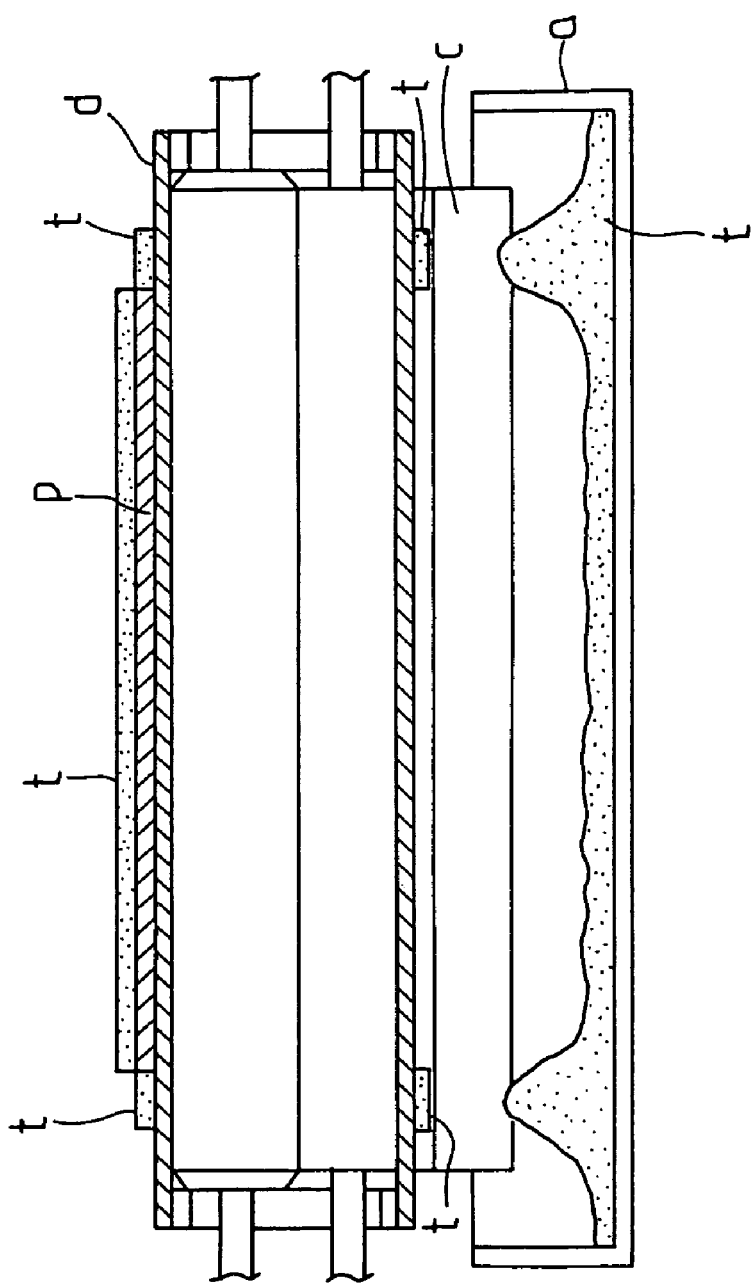
FIG. 25 is an explanatory diagram that illustrates the recovery state of severed toner in the vicinity of the cleaning apparatus associated with a conventional example.

The present invention is not restricted to the embodiments described above, and encompasses various other modified examples. For example, in the embodiments above, the line sensors 51 and 55 were provided on one side in a direction perpendicular to the transport direction of the recording paper P, but as shown in FIG. 23, the line sensors 51 (or 55) may also be respectively provided on one side (the bottom side in FIG. 23) and the other side (the top side in FIG. 23) in a direction perpendicular to the transport direction of the recording paper P. Also, as shown in FIG. 24, a long line sensor 56 may also be provided in the left and right direction spanning from one side (the bottom side in FIG. 24) to the other side (the top side in FIG. 24) in a direction perpendicular to the transport direction of the recording paper P. In this case, the edge position of both the left and right sides of the recording paper P will be more accurately detected, and it is possible to detect the edge position with high precision.

In the first through third embodiments described above, the distance from the detection point where the edge position of the recording paper P is detected by the line sensor to the transfer point is set longer than the distance from the writing point where the electrostatic latent image is written onto the first photosensitive drum 3a (the photosensitive drum 3) of the first image forming station S1 by the first exposing means 8a (the laser writing unit 81) to the transfer point. However, the distance from the detection point where the edge position of the recording paper P is detected by the line sensor to the transfer point may also be set shorter than the distance from the writing point where the electrostatic latent image is written onto the photosensitive drum by the by the exposing means. In this case, when detecting the skew state of the recording paper, because it is necessary to transport the recording paper to some extent and detect the edge position of the recording paper P at the second detection point R2 with the line sensor, it takes time to detect the skew state of the recording paper, and the skew state of the recording paper is detected after the timing at which writing of the electrostatic latent image on the photosensitive drum by the exposing means is begun. When the skew state of the recording paper has been detected, the subsequent size of the image on the photosensitive drum is quickly changed according to the skew state of the recording paper, and the amount of wasted toner recovered after not being transferred to the recording paper can be reduced.

Further, in the fourth and fifth embodiments described above, an electrostatic latent image (image) was written on the photosensitive drum 3 by the laser writing unit 81, but a configuration may also be adopted wherein the electrostatic latent image is written using a solid state scanning optical writing head unit employing a light emitting element array such as an LED, EL, or the like.

The present invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes that come within the meaning and range of equivalency of the claims are intended to be embraced therein.

This application claims priority on Patent Application No. 2003-130453 filed in Japan on May 8, 2003, and Patent Application No. 2003-134609 filed in Japan on May 13, 2003, the entire contents of which are hereby incorporated by reference. Patents and publications cited herein are hereby specifically incorporated by reference in their entirety.

INDUSTRIAL APPLICABILITY

In the above manner, the image forming apparatus of the present invention is extremely advantageous for electrophotographic image forming apparatuses such as color and monochrome digital copy machines, printers, and the like.

The invention claimed is:

1. An image forming apparatus that forms an image on an image carrier based on input image data and transfers the image to a transported sheet, forming an image on this sheet, the image forming apparatus comprising:
   a detecting means for detecting the edge position of the sheet transported toward a transfer point where the image formed on the image carrier is transferred to the sheet, the detecting means being provided upstream in the sheet transport direction relative to the transfer point, and
   wherein when the size of the image on the image carrier is larger than the size of the sheet transported toward the transfer point, the size of the image on the image carrier to be transferred to the midstream of the sheet after detection of the sheet edge position by the detecting means is changed, based on the detection results from the detecting means, and
   subsequent image formation to the sheet continues to be performed according to this image on the image carrier whose size has been changed.

2. The image forming apparatus according to claim 1, wherein the image formed on the image carrier before detection of the sheet edge position by the detecting means is set to a large size provided with a margin in consideration of transport shift of the sheet transported toward the transfer point.

3. The image forming apparatus according to claim 2, wherein a magnification or position where the image is formed on the image carrier is set based on data prescribed in advance regardless of the results of detecting the sheet edge position with the detecting means.

4. The image forming apparatus according to claim 1, wherein the detecting means is provided further downstream than a registration means for correcting transport tilt of the sheet before detection of the sheet edge position by this detecting means, and adjusting the position of the image on the image carrier relative to the sheet.

5. The image forming apparatus according to claim 4, wherein a magnification or position where the image is formed on the image carrier is set based on data prescribed in advance regardless of the results of detecting the sheet edge position with the detecting means.

6. The image forming apparatus according to claim 1, wherein the distance from the detection point by the detecting means to the transfer point is set to be shorter than the distance from a writing point of the image onto the image carrier to the transfer point,
   the size of the image formed on the image carrier before detection of the sheet edge position by the detecting means is set based on data prescribed in advance, and
   the size of the image formed on the image carrier after detection of the sheet edge position by the detecting means is changed based on the detection results of the detecting means.

7. The image forming apparatus according to claim 6, wherein a magnification or position where the image is formed on the image carrier is set based on data prescribed in advance regardless of the results of detecting the sheet edge position with the detecting means.

8. The image forming apparatus according to claim 1, further comprising a plurality of image carriers that individually form an image on the sheet, arranged in parallel in the transport direction of a sheet cater that carries and transports the sheet,
   wherein the size of the image on the image carrier located furthest upstream in the sheet transport direction among the image carriers is changed during image formation after detection of the sheet edge position by the detecting means, and
   the size of the image on the other image carriers is changed before image formation based on the results of detecting the sheet edge position with the detecting means.

9. The image forming apparatus according to claim 8, wherein there is correction data for one among the various image carriers that corrects image forming positional shift of the remaining image caters relative to that one image cater, and
   the size of the image formed on the respective image carriers is set based on the results of detecting the sheet edge position with the detecting means and the correction data.

10. The image forming apparatus according to claim 1, wherein a magnification or position where the image is formed on the image cater is set based on data prescribed in advance regardless of the results of detecting the sheet edge position with the detecting means.

11. The image forming apparatus according to claim 1, wherein a borderless image forming mode for forming a borderless image on the sheet can be selected, and
   wherein when this borderless image forming mode is selected, image formation is performed based on the results of detecting the sheet edge position with the detecting means.

12. The image forming apparatus according to claim 1, wherein when the size of the image on the image cater is larger than the size of the sheet transported toward the transfer point, the skew state of the sheet is also detected by detecting the sheet edge position with the detecting means, and the size of the image on the image cater to be transferred to the midstream of the sheet after that detection is changed based on the results of detecting the edge position and skew state of the sheet with the detecting means, and wherein subsequent image formation to the sheet continues to be performed according to this image on the image carrier whose size has been changed.

13. The image forming apparatus according to claim 12, wherein the image formed on the image carrier before detection of the edge position and skew state of the sheet by the detecting means is set to a large size provided with a margin in consideration of transport shift of the sheet transported toward the transfer point.

14. The image forming apparatus according to claim 12, wherein the detecting means is provided further downstream in the sheet transport direction than a registration means that adjusts the position of the image on the image carrier relative to the sheet before detection of the edge position and skew state of the sheet by the detecting means.

15. The image forming apparatus according to claim 12, wherein the distance from the detection point by the detecting means to the transfer point is set to be shorter than the distance from a writing point of the image onto the image carrier to the transfer point,
    the size of the image formed on the image carrier before detection of the edge position and skew state by the detecting means is set based on data prescribed in advance, and
    the size of the image formed on the image carrier after detection of the edge position and skew state of the sheet by the detecting means is changed based on the results of detecting the edge position and skew state of the sheet with the detecting means.

16. The image forming apparatus according to claim 12, wherein the distance from the detection point by the detecting means to the transfer point is set to be shorter than the distance from a writing point of the image onto the image cater to the transfer point,
    the size of the image formed on the image cater is set based on the results of detecting the sheet edge position with the detecting means, and
    when the skew state of the sheet has been detected by the detecting means, the size of the image formed on the image cater after that detection is changed based on the results of detecting the skew state of the sheet.

17. The image forming apparatus according to claim 16, wherein there is correction data for one among the various image carriers that corrects image forming positional shift of the remaining image carriers relative to tat one image carrier, and
    the size of the image formed on the respective image carriers is set based on the results of detecting the edge position and skew state of the sheet with the detecting means and the correction data.

18. The image forming apparatus according to claim 12, further comprising a plurality of image caters that individually form an image on the sheet, arranged in parallel in the transport direction of a sheet carrier That carries and transports the sheet, and
    wherein the size of the image on the image carrier located furthest upstream in the sheet transport direction among the image caters is changed after image formation has begun based on the results of detecting the edge position and skew state of the sheet with the detecting means, and
    the size of the image on the other image carriers is changed before image formation begins based on the results of detecting the edge position and skew state of the sheet with the detecting means.

19. The image forming apparatus according to claim 12, wherein a magnification or position where the image is formed on the image cater is set based on data prescribed in advance regardless of the results of detecting the edge position and skew state of the sheet with the detecting means.

20. The image forming apparatus according to claim 12, wherein a borderless image forming mode for forming a borderless image on the sheet can be selected, and
    wherein when this borderless image forming mode is selected, image formation is performed based on the results of detecting the edge position and skew state of the sheet with the detecting means.

* * * * *